US012606255B2

(12) United States Patent
Young

(10) Patent No.: US 12,606,255 B2
(45) Date of Patent: Apr. 21, 2026

(54) PICKUP BED STORAGE SYSTEM

(71) Applicant: Brandilynne Young, St. Cloud, MN (US)

(72) Inventor: Brandilynne Young, St. Cloud, MN (US)

( * ) Notice: Subject to any disclaimer, the term of this patent is extended or adjusted under 35 U.S.C. 154(b) by 348 days.

(21) Appl. No.: 18/424,099

(22) Filed: Jan. 26, 2024

(65) Prior Publication Data

US 2025/0242870 A1      Jul. 31, 2025

(51) Int. Cl.
 B62D 33/02          (2006.01)
 B62D 33/08          (2006.01)

(52) U.S. Cl.
 CPC ......... B62D 33/0207 (2013.01); B62D 33/08 (2013.01)

(58) Field of Classification Search
 CPC ..... B62D 33/0207; B60R 9/042; B60R 9/055; B60R 2011/0049; B60R 2011/004; B60R 2011/005; B60R 2011/008; B60R 2011/0084; B60P 7/0815
 See application file for complete search history.

(56) References Cited

U.S. PATENT DOCUMENTS

| | | | |
|---|---|---|---|
| 7,128,356 B2 | 10/2006 | Bassett | |
| 8,281,967 B2 | 10/2012 | Evans | |
| 9,580,004 B2 | 2/2017 | Puchkoff | |
| 9,656,589 B2 | 5/2017 | Crawford, Jr. | |
| 11,292,400 B2 | 4/2022 | Spencer | |
| 2006/0244279 A1 | 11/2006 | Ranka | |
| 2009/0096236 A1 | 4/2009 | Hawley | |
| 2016/0311377 A1 | 10/2016 | Aftanas | |

FOREIGN PATENT DOCUMENTS

WO      WO2009132422      11/2009

*Primary Examiner* — Nicholas McFall
*Assistant Examiner* — Eric Acosta

(57)      ABSTRACT

A pickup bed storage system for storing and organizing objects in a bed of a pickup truck includes a mat that is positionable on the bed and extends between a front end and a rear end of the bed. A pair of rails is coupled to the mat. A container movably coupled to the pair of rails is slidable between the front end and the rear end of the bed. The container has a front wall, a back wall, and a peripheral wall that is coupled to and extends between the front wall and the back wall to define an interior space. The peripheral wall is expandable to adjust a volume of the interior space. A pulley mechanism is coupled to the container and the pair of rails to slide the container along the pair of rails.

20 Claims, 24 Drawing Sheets

30

26

PICKUP BED STORAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cargo boxes and more particularly pertains to a new cargo box for storing and organizing objects in a bed of a pickup truck.

(2) Description of Related Art Including Information Disclosed Under 37 CFR 1.97 and 1.98

The prior art relates to cargo boxes. More specifically, the prior art relates to cargo boxes that can be coupled to or positioned in the bed of a pickup truck. The bed of a pickup truck offers a substantial amount of cargo space for transporting items. However, those items can move around in the bed of the pickup truck, particularly when the pickup truck accelerates, brakes, or turns. If the items are small, lightweight, or fragile, movement around the bed of the pickup truck during transport can pose a significant risk to the safety of the items. The prior art therefore discloses cargo boxes that can be mounted to the bed of the pickup truck for holding and organizing the items during transport. However, such cargo boxes are typically mounted near the cab of the pickup truck, requiring the user to climb into the bed of the truck to load and unload the cargo boxes. Thus, there is a need for a cargo box that can be moved toward the tailgate of the pickup truck to facilitate the user in loading and unloading the cargo box without climbing into the bed of the pickup truck. Prior art cargo boxes are also typically manufactured in a single size, or a set range of sizes, such that the cargo boxes are only useful for a set size or number of items. Thus, there is a need in the art for a cargo box that can be expanded in size to accommodate a wider range of items.

BRIEF SUMMARY OF THE INVENTION

An embodiment of the disclosure meets the needs presented above by generally comprising a pickup truck having a bed extending outwardly from a cab. The bed has a rear end that is positioned adjacent to the cab and a front end that is spaced from the rear end. A mat is removably positionable on the bed of the pickup truck. The mat extends between the front end and the rear end of the bed of the pickup truck. A pair of rails is coupled to the mat. The pair of rails extends between the front end and the rear end of the bed of the pickup truck when the mat is positioned on the bed of the pickup truck. A container is positionable in the bed of the pickup truck. The container is movably coupled to the pair of rails wherein the container is slidable along the pair of rails between the front end and the rear end of the bed of the pickup truck. The container has an interior space. The container further comprises a front wall that is openable to facilitate access to the interior space. A back wall is parallel to the front wall. The back wall is spaced from the front wall. A peripheral wall is coupled to and extends between the front wall and the back wall to define the interior space. The peripheral wall is expandable and retractable to selectively adjust a volume of the interior space. A pulley mechanism is coupled to the container and the pair of rails. The pulley mechanism is actuatable to slide the container along the pair of rails between the front end and the rear end of the bed of the pickup truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
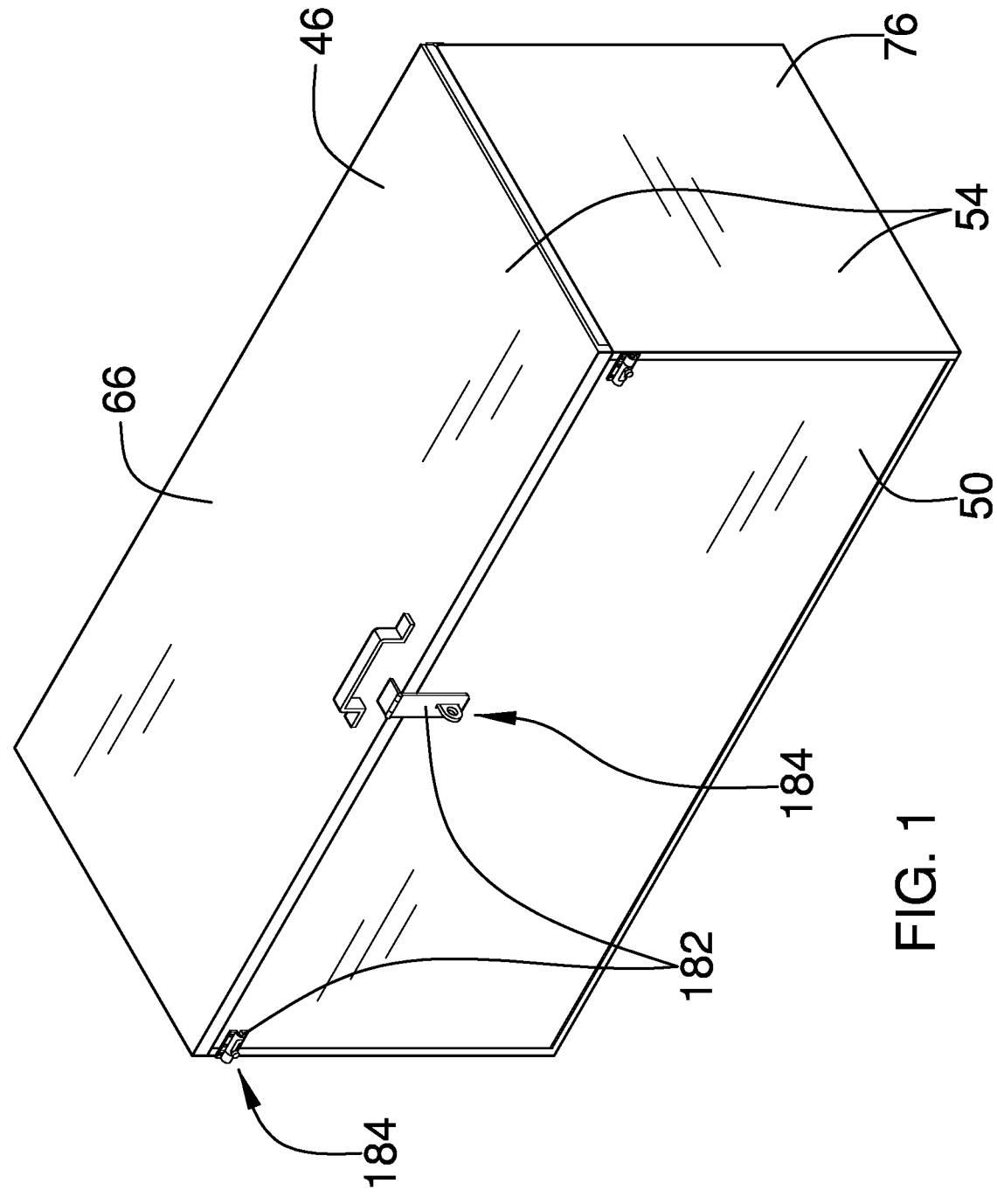
FIG. 1 is a front isometric view of a pickup bed storage system according to an embodiment of the disclosure.
Figure 2:
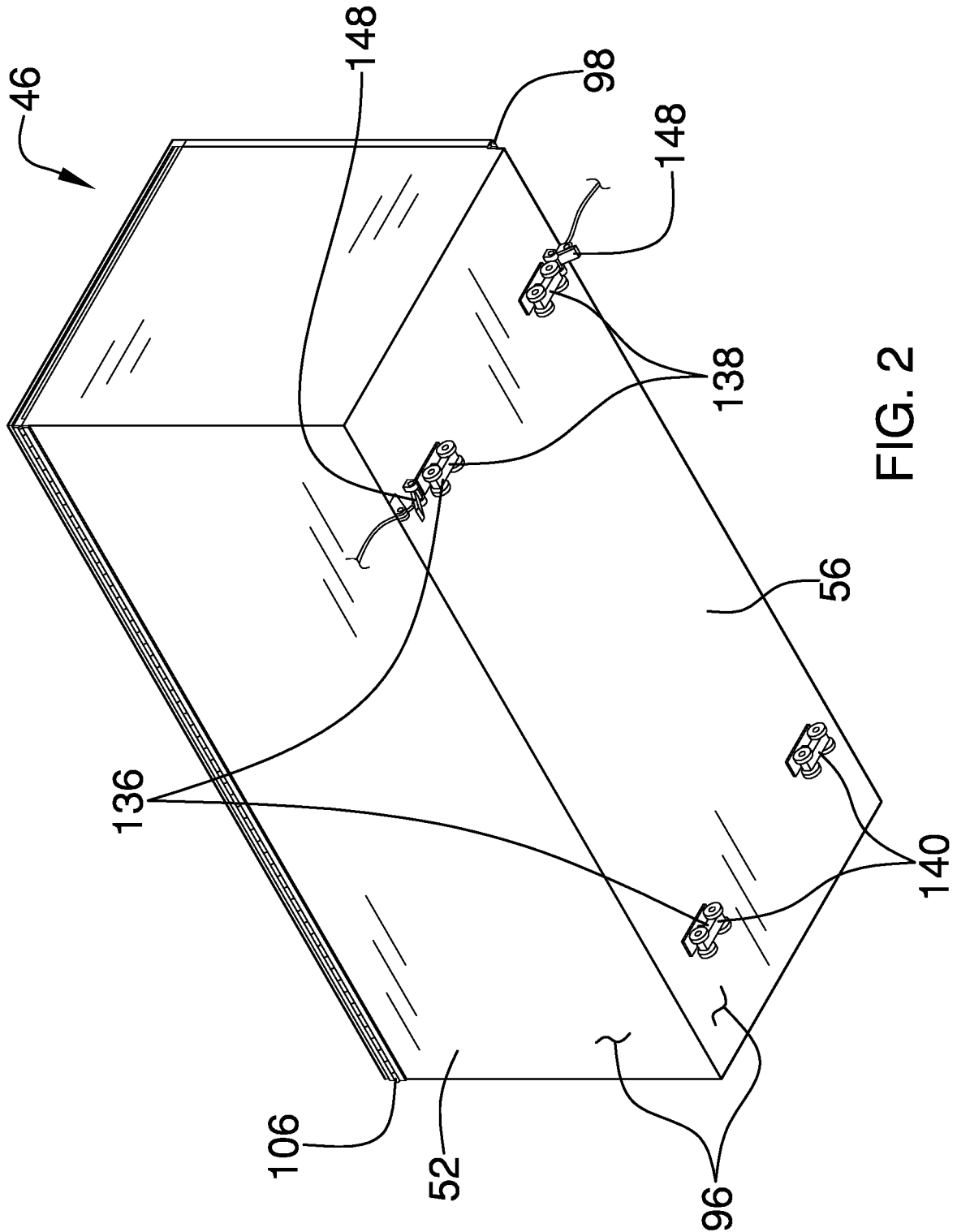
FIG. 2 is a bottom isometric view of an embodiment of the disclosure.

With reference now to the drawings, and in particular to FIGS. 1 through 23 thereof, a new cargo box embodying the principles and concepts of an embodiment of the disclosure and generally designated by the reference numeral 10 will be described.

As best illustrated in FIGS. 1 through 23, the pickup bed storage system 10 generally comprises a pickup truck 12 having a bed 14 that is coupled to and extends outwardly from a cab 16. The bed 14 has a rear end 18 that is positioned adjacent to the cab 16 and a front end 20 that is spaced from the rear end 18. The bed 14 generally includes a base wall 194 and a side wall 196 that is coupled to and extends upwardly from the base wall 194.

The pickup truck 12 may further comprise a pair of wheel wells 22 that is coupled to and extends upwardly from the base wall 194 of the bed 14. Each wheel well of the pair of wheel wells 22 is generally positioned on opposing lateral sides of the side wall 196. The pair of wheel wells 22 are generally aligned with each other across the base wall 194 of the bed 14.

A tailgate 24 may be coupled to the side wall 196 of the bed 14. The tailgate 24 is generally positioned on the front end 20 of the bed 14. The tailgate 24 is typically openable to facilitate access to the bed 14 of the pickup truck 12.

A mat 26 is removably positionable on the base wall 194 of the bed 14 of the pickup truck 12. The mat 26 generally extends between the front end 20 and the rear end 18 of the bed 14 of the pickup truck 12. The mat 26 may have a forward edge 28, a rearward edge 30, and a pair of lateral edges 32 that are each coupled to and extend between the forward edge 28 and the rearward edge 30.

Figure 3A:
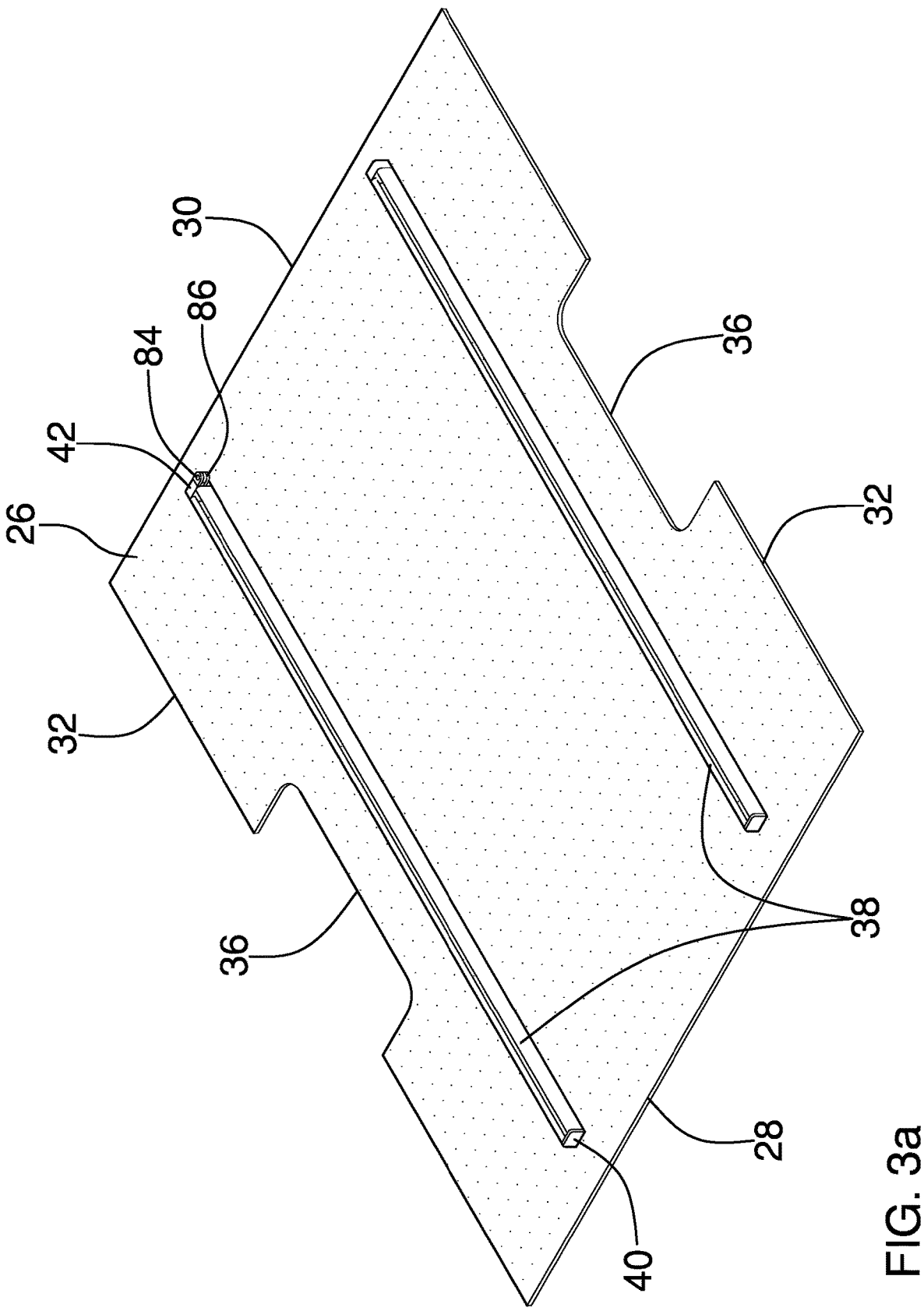
FIG. 3a is a top isometric view of an embodiment of the disclosure.
Figure 3B:
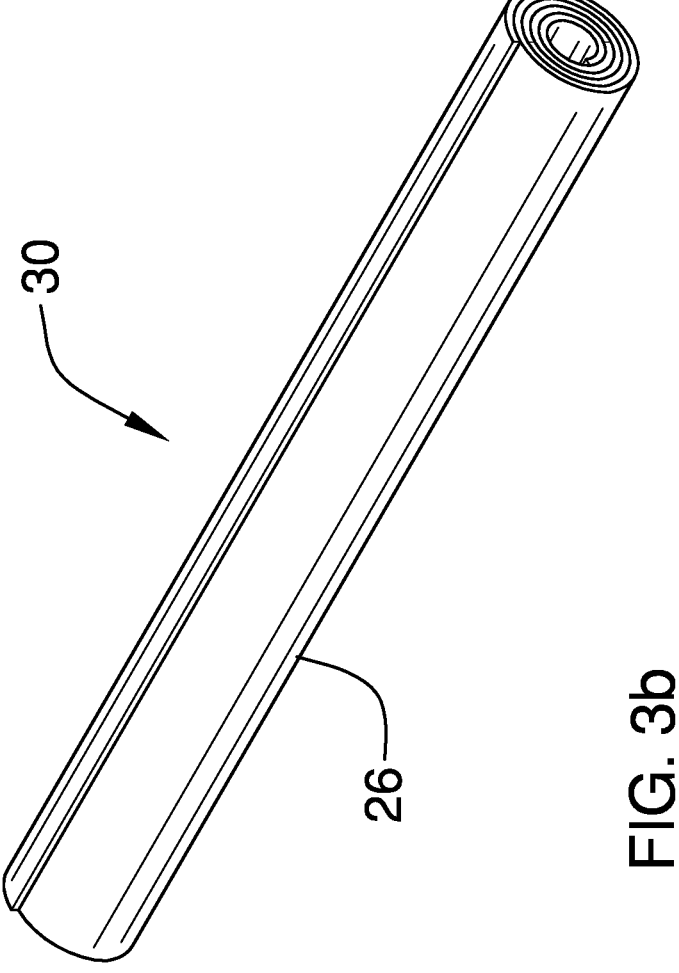
FIG. 3b is a top isometric view of an embodiment of the disclosure.

The mat 26 may comprise a flexible material wherein the mat 26 is configured to be foldable into a storage configuration 34 when the mat 26 is removed from the base wall 194 of the bed 14 of the pickup truck 12. For example, as shown in FIG. 3b, the mat 26 may be rolled up when the mat 26 is in the storage configuration 34. Alternatively, the mat 26 may be otherwise folded, for example along a longitudinal line that extends between the pair of lateral edges 32, or along a transverse line that extends between the forward edge 28 and the rearward edge 30. In embodiments, the flexible material may comprise rubber. Folding the mat 26 into the storage configuration 34 can facilitate a user in transporting or storing the mat 26 when the pickup bed storage system 10 is not being used.

The mat 26 may further comprise a pair of cutouts 36 that extends into the pair of lateral edges 32. The pair of cutouts 36 is generally aligned with the pair of wheel wells 22 of the pickup truck 12 wherein each of the pair of wheel wells 22 is positioned within an associated cutout of the pair of cutouts 36 when the mat 26 is positioned on the base wall 194 of the bed 14 of the pickup truck 12.

A pair of rails 38 is coupled to the mat 26. The pair of rails 38 may extend between the forward edge 28 and the rearward edge 30 of the mat 26. In other words, the pair of rails 38 may extend between the front end 20 and the rear end 18 of the bed 14 of the pickup truck 12 when the mat 26 is positioned on the bed 14 of the pickup truck 12. Each rail of the pair of rails 38 is generally parallel to the other rail of the pair of rails 38. Each rail of the pair of rails 38 is also generally parallel to the pair of lateral edges 32 of the mat 26. Each rail of the pair of rails 38 may be positioned proximate to an associated lateral edge of the pair of lateral edges 32 of the mat 26.

Each rail of the pair of rails 38 may further comprise a first end cap 40 that is positioned proximate to the forward edge 28 of the mat 26 and a second end cap 42 that is positioned proximate to the rearward edge 30 of the mat 26. In other words, the first end cap 40 may be proximate to the front end 20 of the bed 14 of the pickup truck 12 when the mat 26 is positioned on the bed 14 of the pickup truck 12. The second end cap 42 is spaced from the first end cap 40. The second end cap 42 may accordingly be positioned proximate to the rear end 18 of the bed 14 of the pickup truck 12 when the mat 26 is positioned on the bed 14 of the pickup truck 12.

The pair of rails 38 may be removably coupled to the mat 26. In such embodiments, a plurality of fasteners 44 may removably couple each rail of the pair of rails 38 to the mat 26. For example, each fastener of the plurality of fasteners 44 may comprise a screw.

A container 46 is positionable in the bed 14 of the pickup truck 12. The container 46 is movably coupled to the pair of rails 38 wherein the container 46 is slidable along the pair of rails 38 between the front end 20 and the rear end 18 of the bed 14 of the pickup truck 12. The container 46 has an interior space 48. The container 46 may have a height that is less than a height of the side wall 196 of the bed 14 of the pickup truck 12 wherein the container 46 is configured to fit within the bed 14 of the pickup truck 12 when a tonneau cover is extended over the bed 14 of the pickup truck 12.

The container 46 may be removably coupled to the pair of rails 38 wherein the container 46 is removable from the pair of rails 38, for example to facilitate the user in removing the mat 26 from the bed 14 of the pickup truck 12 or to facilitate removal of the pair of rails 38 from the mat 26.

The container 46 may further comprise a front wall 50 that is openable to facilitate access to the interior space 48. The front wall 50 is generally aligned with the tailgate 24 of the pickup truck 12 when the container 46 is positioned at the front end 250 of the bed 14 of the pickup truck 12. A back wall 52 of the container 46 is parallel to the front wall 50. The back wall 52 is spaced from the front wall 50. A peripheral wall 54 is coupled to and extends between the front wall 50 and the back wall 52 to define the interior space 48.

The peripheral wall 54 may be expandable and retractable to selectively adjust a volume of the interior space 48. For example, the peripheral wall 48 may further comprise a bottom panel 56 that is perpendicular to each of the front wall 50 and the back wall 52. The bottom panel 56 is generally positioned adjacent to the pair of rails 38 when the container 46 is coupled to the pair of rails 38.

The bottom panel 56 may further comprise a first bottom plate 58 that is coupled to the front wall 50. The first bottom plate 58 extends outwardly from the front wall 50 toward the back wall 52. The first bottom plate 58 may have a terminal edge 60 that is pivotably coupled to the front wall 50 of the container 46 wherein the front wall 50 of the container 46 is configured to pivot downwardly from the peripheral wall 54 to permit access to the interior space 48 through a front side 62 of the container 46.

A second bottom plate 64 may be coupled to the back wall 52. The second bottom plate 64 extends outwardly from the back wall 52 toward the front wall 50. The second bottom plate 64 may be slidably coupled to the first bottom plate 58 wherein the second bottom plate 64 slides outwardly from the first bottom plate 58 when the peripheral wall 54 is expanded and wherein the second bottom plate 64 is positioned beneath the first bottom plate 58 when the peripheral wall 54 is retracted.

Figure 10:
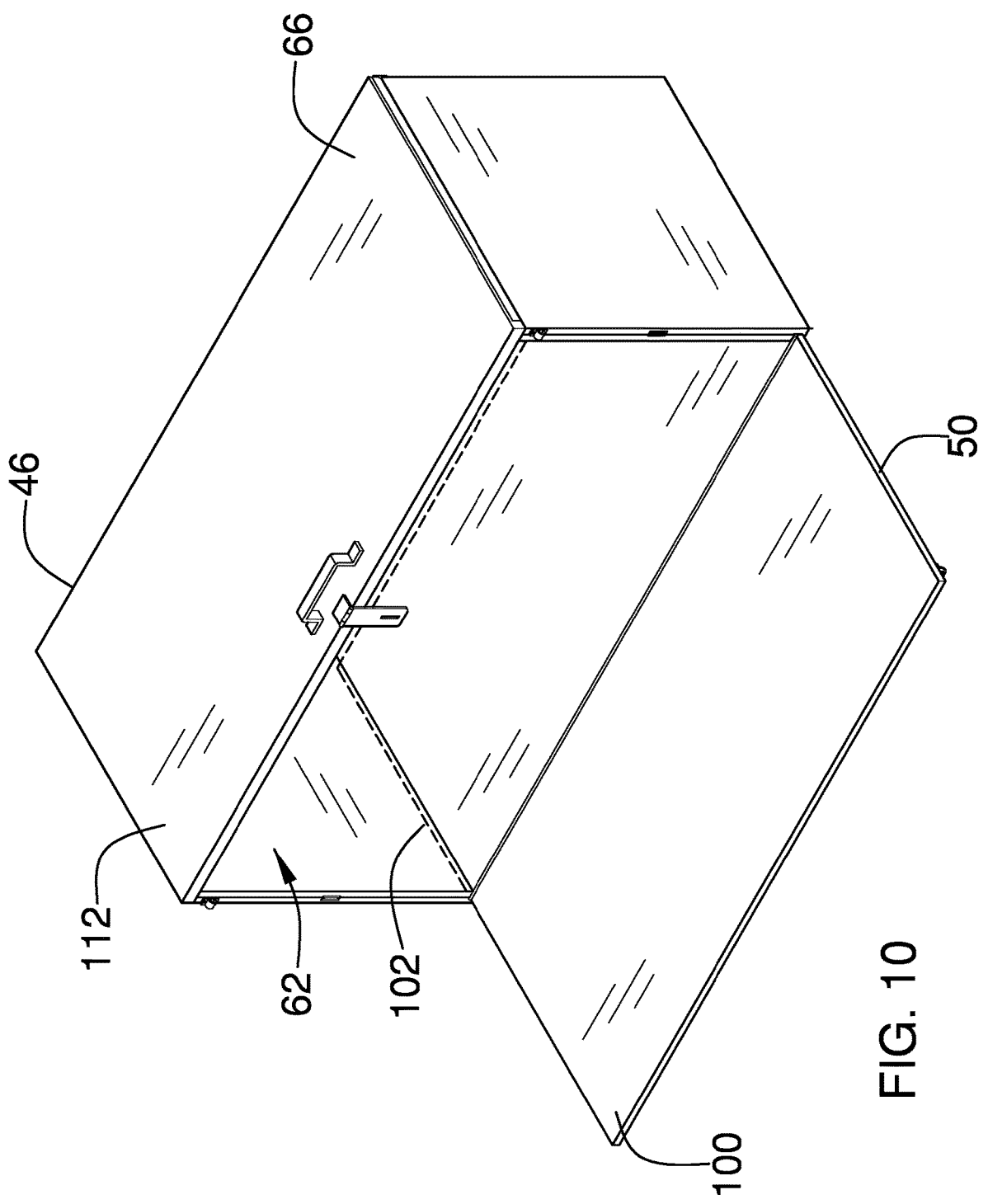
FIG. 10 is a front isometric view of an embodiment of the disclosure.
Figure 11:
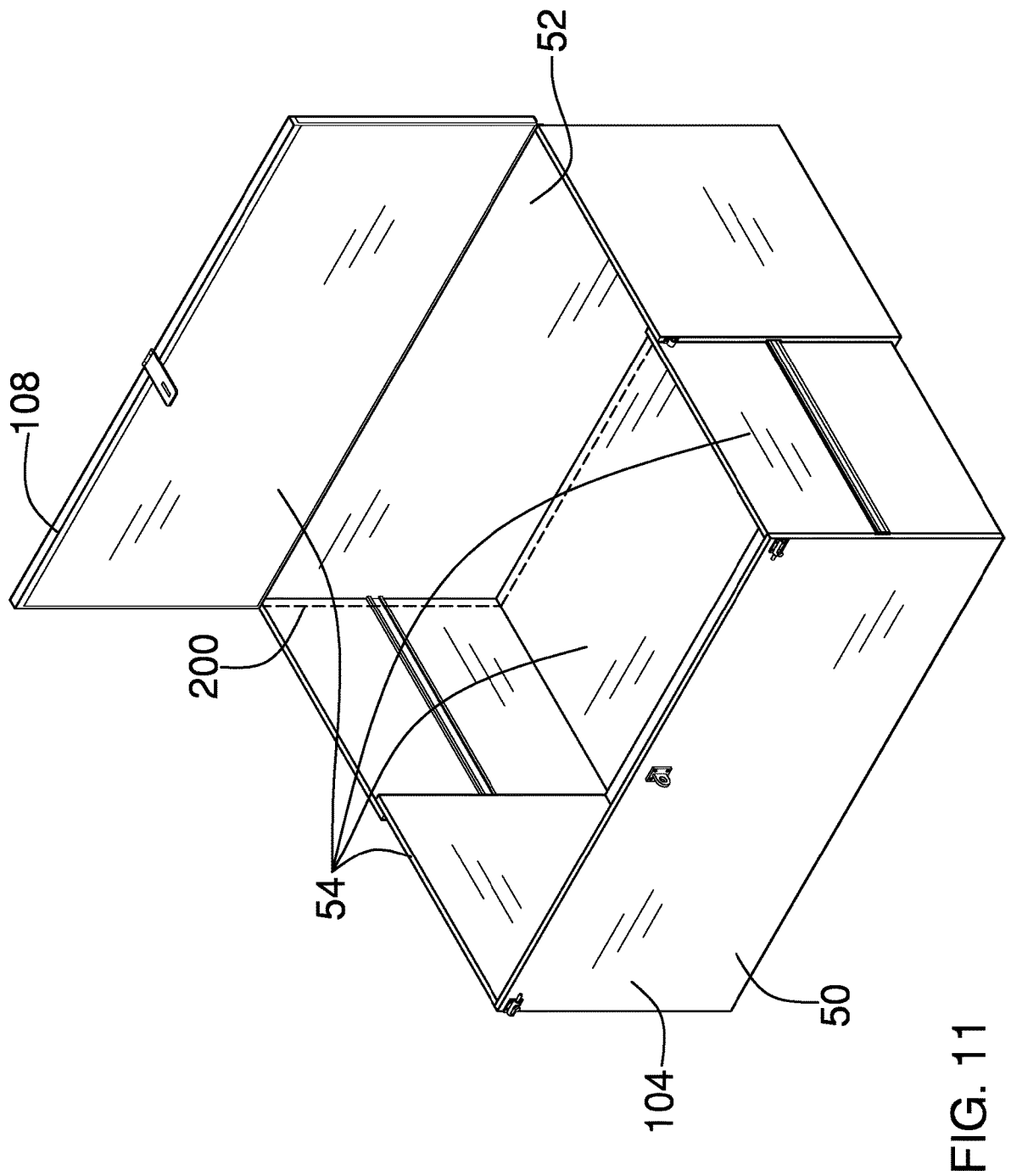
FIG. 11 is a front isometric view of an embodiment of the disclosure.
Figure 12:
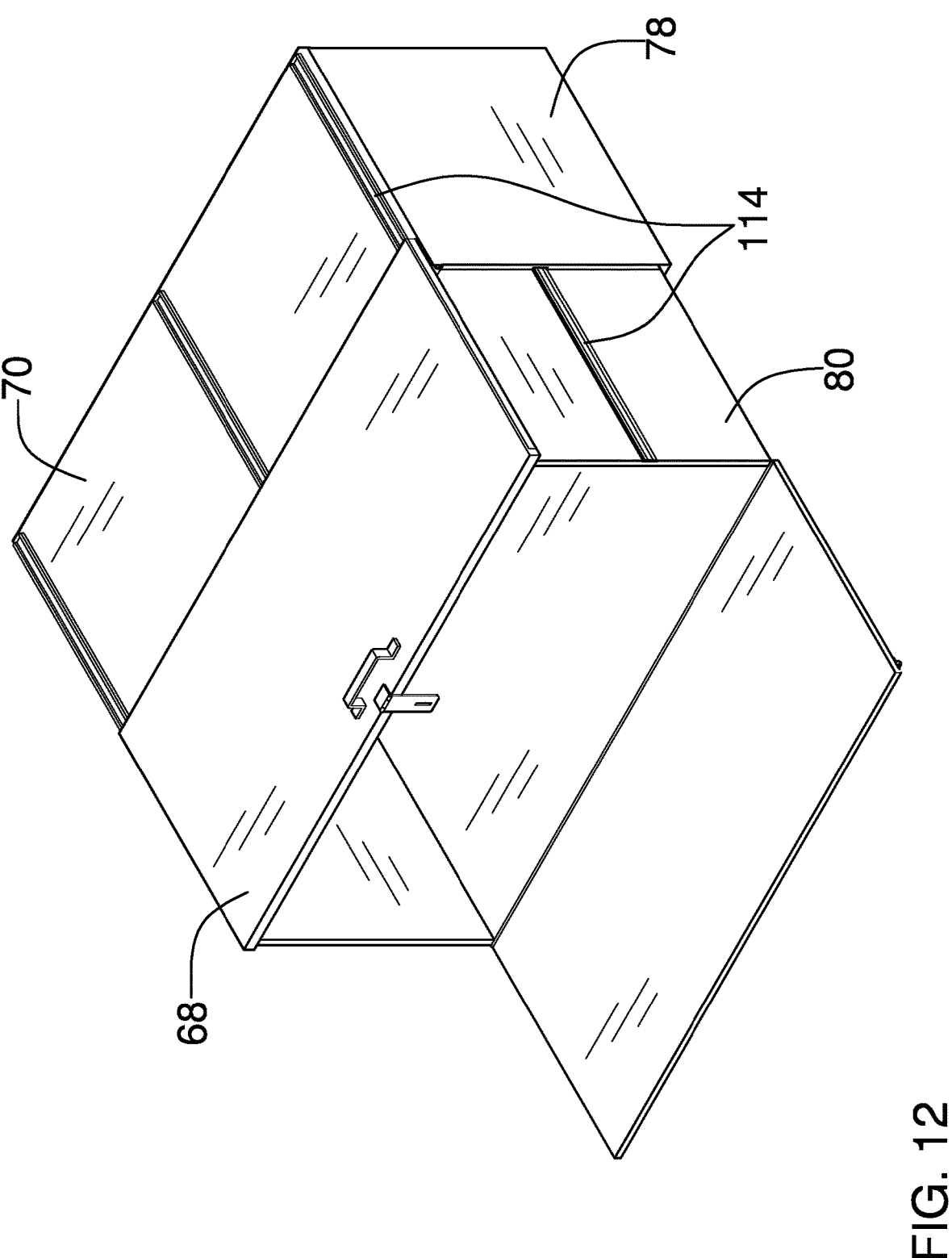
FIG. 12 is a front isometric view of an embodiment of the disclosure.

A front hinge 98 may pivotably couple the first bottom plate 58 of the bottom panel 56 of the peripheral wall 54 to the front wall 50 of the container 46. The front hinge 98 is generally configured to facilitate the front wall 50 of the container 46 in being pivoted relative to the terminal edge 60 of the first bottom plate 58. For example, the front wall 50 may be pivotable between a primary open position 100, a secondary open position 102, and a shut position 104. In such embodiments, the primary open position 100 may be approximately 180.0° from the secondary open position 102. The primary open position 100 and the secondary open position 102 may each be approximately 90.0° from the shut position 104. In other words, the primary open position 100 may be parallel to the secondary open position 102, and perpendicular to the shut position 104. As shown in FIG. 10, the front wall 50 of the container 46 may be positioned in front of the bottom panel 56 of the peripheral wall 54 when the front wall 50 is in the primary open position 100. The front wall 50 of the container 46 may be positioned on top of the bottom panel 56 of the peripheral wall 54 when the front wall 50 is in the secondary open position 102. The front wall 50 may be aligned with the back wall 52 when the front wall 50 is in the shut position 104.

A top panel 66 is distally positioned to the bottom panel 56 on each of the front wall 50 and the back wall 52. The top panel 66 may be openable to facilitate access to the interior space 48 of the container. The top panel 66 may be perpendicular to each of the front wall 50 and the back wall 52 when the top panel 66 is closed. The top panel 66 may be parallel to the bottom panel 56 when the top panel 66 is closed.

The top panel 66 may further comprise a first top plate 68 that is coupled to the front wall 50. The first top plate 68 extends outwardly from the front wall 50 toward the back wall 52. The first top plate 68 may be releasably coupled to the front wall 50 wherein the first top plate 68 is detachable from the front wall 50 when the front wall 50 is pivoted downwardly from the terminal edge 60 of the first bottom plate 58.

A second top plate 70 may be coupled to the back wall 52. The second top plate 70 extends outwardly from the back wall 52 toward the front wall 50. The second top plate 70 is slidably coupled to the first top plate 68. For example, the second top plate 70 may slide outwardly from the first top plate 68 when the peripheral wall 54 is expanded. The second top plate 70 may be positioned beneath the first top plate 68 when the peripheral wall 54 is retracted.

When the top panel 66 is openable to facilitate access to the interior space 48, the second top plate 70 may be pivotably coupled to an upper edge 72 of the back wall 52 wherein the second top plate 70 is configured to pivot upwardly from the back wall 52 to permit access to the interior space 48 through a top side 74 of the container 46.

Figure 9:
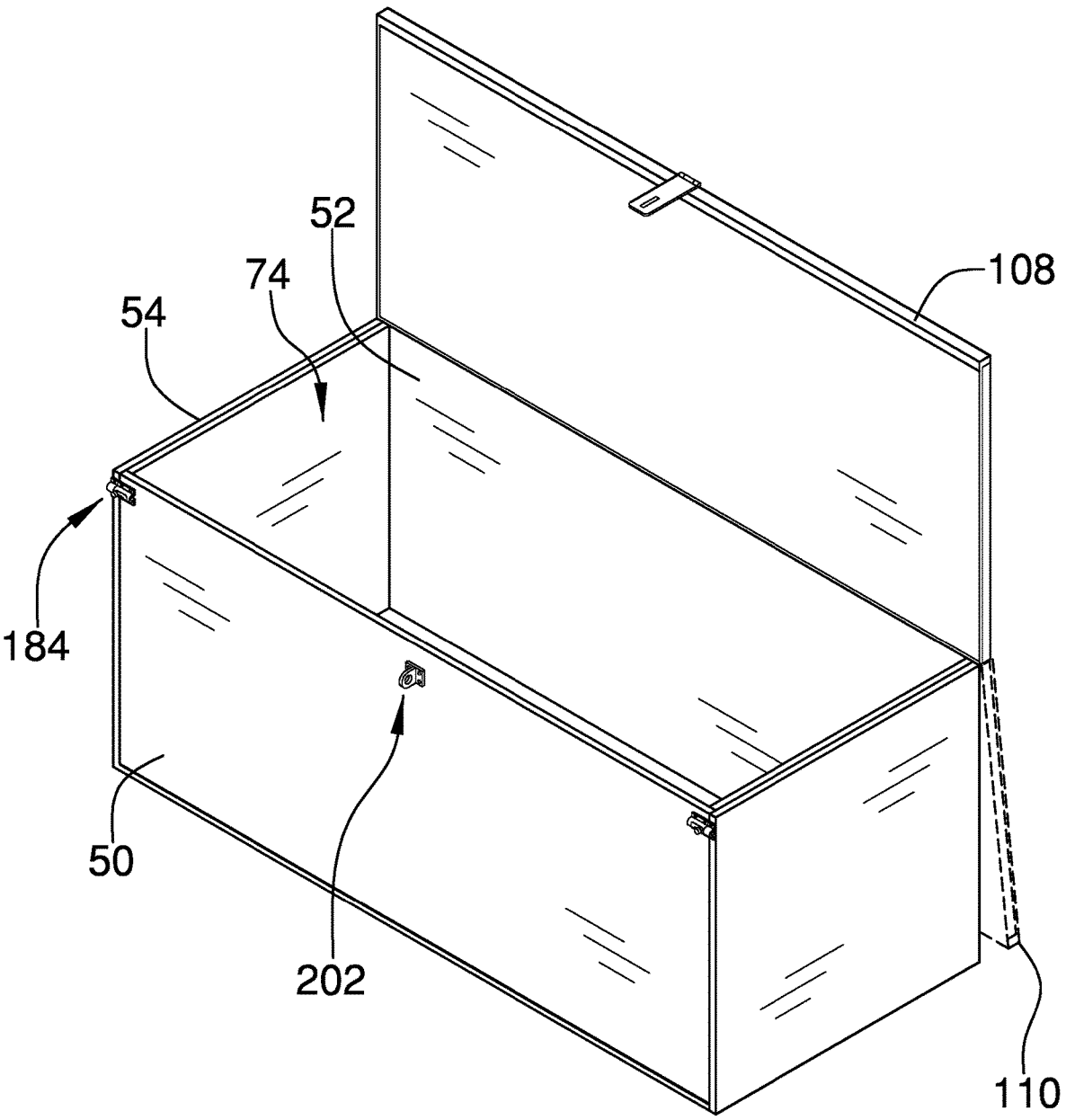
FIG. 9 is a front isometric view of an embodiment of the disclosure.

A top hinge 106 may pivotably couple the second top plate 70 of the top panel 66 of the peripheral wall 54 to the back wall 52 of the container 46. The top hinge 106 is generally configured to facilitate the top panel 66 of the peripheral wall 54 of the container 46 in pivoting relative to the upper edge 72 of the back wall 52 of the container 46. For example, the top panel 66 may be pivotable between a first open position 108, a second open position 110, and a closed position 112. The first open position 108 may be approximately 90.0° from the closed position 112. The second open position 110 may be approximately 270.0° from the closed position 112. In other words, the top panel 66 may be parallel to the back wall 52 of the container 46 when the top panel 66 is in the first open position 108 and the second open position 110. The top panel 66 may be perpendicular to the back wall 52 when the top panel 66 is in the closed position 112. As shown in FIG. 9, the top panel 66 may extend upwardly from the upper edge 72 of the back wall 52 when the top panel 66 is in the first open position 108. The top panel 66 may be positioned against the exterior surface 96 of the back wall 52 of the container 46 when the top panel 66 is in the second open position 110.

In other embodiments, the top hinge 106 may be configured to facilitate the top panel 66 in pivoting nearly 360.0° relative to the upper edge 72 of the back wall 52. For example, the top panel 66 may be pivotable between the first open position 108, the second open position 110, a third open position 200, and the closed position 112. The third open position 200 is generally parallel to the second open position 110, wherein the top panel 66 is positioned against an interior surface 198 of the back wall 52 of the container 46. An example of such embodiments is provided in FIG. 11.

The peripheral wall 54 may further include a pair of lateral panels 76 that may be parallel with each other. The pair of lateral panels 76 may be perpendicular to the front wall 50 and the back wall 52. The pair of lateral panels 76 may be perpendicular to the bottom panel 56 and the top panel 66. The pair of lateral panels 76 may be aligned with opposing lateral sides of the side wall 196 of the bed 14 of the pickup truck 12 when the container 46 is positioned in the bed 14 of the pickup truck 12.

Each lateral panel of the pair of lateral panels 76 may further comprise a first side plate 78 that is coupled to and extends upwardly from the first bottom plate 58 of the bottom panel 56 toward the top panel 66. A second side plate 80 may be coupled to and extend upwardly from the second bottom plate 64 of the bottom panel 56 toward the top panel 66.

The second side plate 80 may be slidably coupled to the first side plate 78. For example, the second side plate 80 may slide outwardly from the first side plate 78 when the peripheral wall 54 is expanded. The second side plate 80 may be positioned over the first side plate 78 when the peripheral wall 54 is retracted.

A plurality of telescopic slides 114 may be coupled to the peripheral wall 54 of the container 46. The plurality of telescopic slides 114 is generally configured to facilitate expansion and retraction of the peripheral wall 54 of the container 46.

For example, a first telescopic slide 116 may be coupled to a first lateral panel 118 of the pair of lateral panels 76. The first telescopic slide 116 slidably couples the first side plate 78 of the first lateral panel 118 to the second side plate 80 of the first lateral panel 118.

A second telescopic slide 120 may be coupled to a second lateral panel 122 of the pair of lateral panels 78. The second telescopic slide 120 slidably couples the first side plate 78 of the second lateral panel 122 to the second side plate 80 of the second lateral panel 122. The second telescopic slide 120 may be aligned with the first telescopic slide 116 across the container 46.

A third telescopic slide 124 may be coupled to the bottom panel 56. The third telescopic slide 124 slidably couples the first bottom plate 58 to the second bottom plate 64. The third telescopic slide 124 may be positioned adjacent to a junction between the bottom panel 56 and the first lateral panel 118 of the pair of lateral panels 78.

A fourth telescopic slide 126 may be coupled to the bottom panel 56. The fourth telescopic slide 126 slidably couples the first bottom plate 58 to the second bottom plate 64. The fourth telescopic slide 126 is generally spaced from the third telescopic slide 124. For example, the fourth telescopic slide 126 may be positioned midway between the first lateral panel 118 of the pair of lateral panels 76 and the second lateral panel 122 of the pair of lateral panels 76.

A fifth telescopic slide 128 may be coupled to the bottom panel 56. The fifth telescopic slide 128 slidably couples the first bottom plate 58 to the second bottom plate 64. The fifth telescopic slide 128 may be positioned adjacent to a junction between the bottom panel 56 and the second lateral panel 122 of the pair of lateral panels 76. The fifth telescopic slide 128 is generally spaced from the fourth telescopic slide 126.

A sixth telescopic slide 130 may be coupled to the top panel 66. The fifth telescopic slide 128 slidably couples the first top plate 68 to the second top plate 70. The sixth telescopic slide 130 may be positioned adjacent to a junction between the top panel 66 and the first lateral panel 118 of the pair of lateral panels 76.

A seventh telescopic slide 132 may be coupled to the top panel 66. The seventh telescopic slide 132 slidably couples the first top plate 68 to the second top plate 70. The seventh telescopic slide 132 is generally spaced from the sixth telescopic slide 130. The seventh telescopic slide 132 may be aligned with the fourth telescopic slide 126. The seventh telescopic slide 132 may be positioned midway between the first lateral panel 118 of the pair of lateral panels 76 and the second lateral panel 122 of the pair of lateral panels 76.

An eighth telescopic slide 134 may be coupled to the top panel 66. The eighth telescopic slide 134 slidably couples the first top plate 68 to the second top plate 70. The eighth telescopic slide 134 may be positioned adjacent to a junction between the top panel 66 and the second lateral panel 122 of the pair of lateral panels 76. The eighth telescopic slide 134 is generally spaced from the seventh telescopic slide 132.

Figure 4:
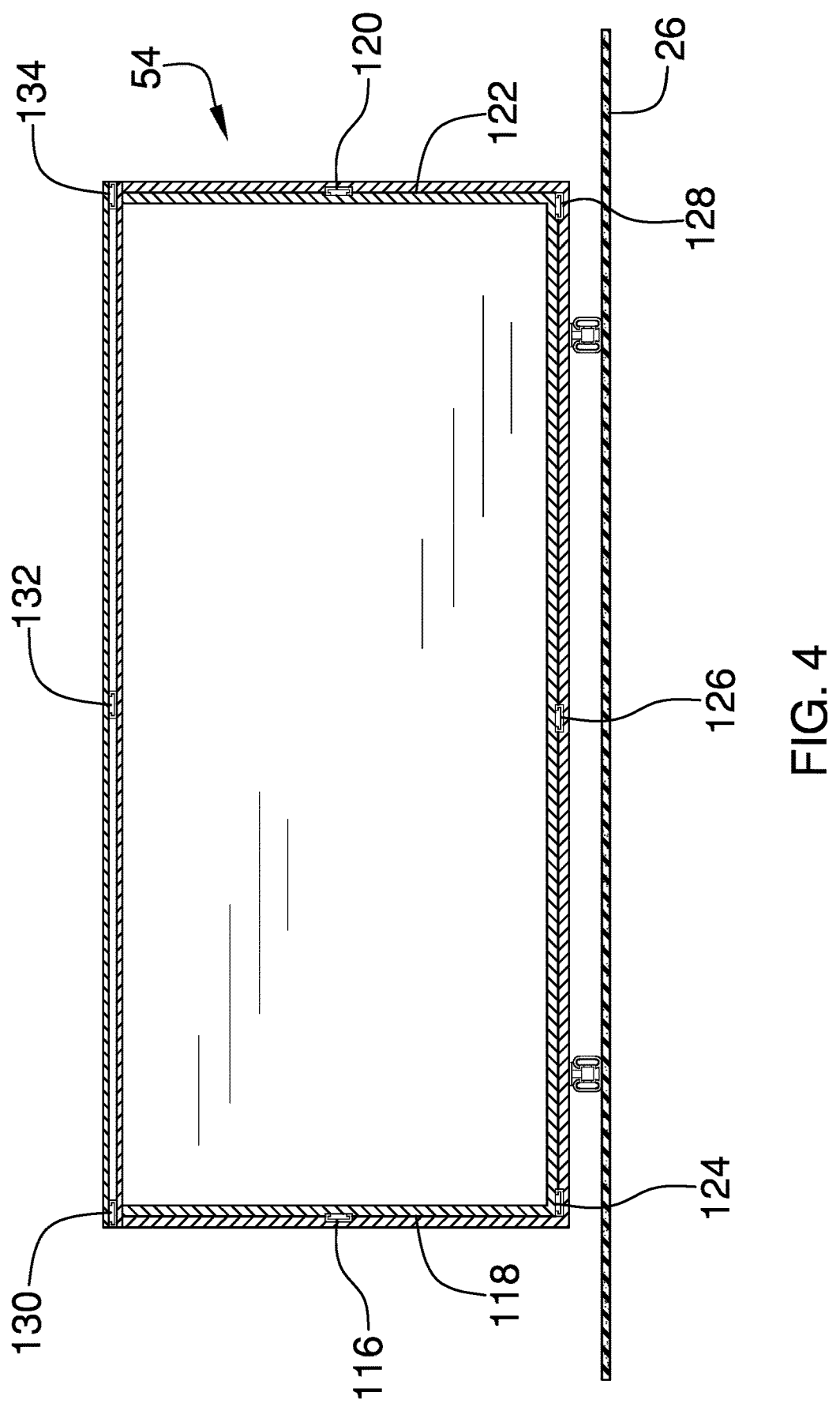
FIG. 4 is a cross-sectional view of an embodiment of the disclosure.
Figure 5:
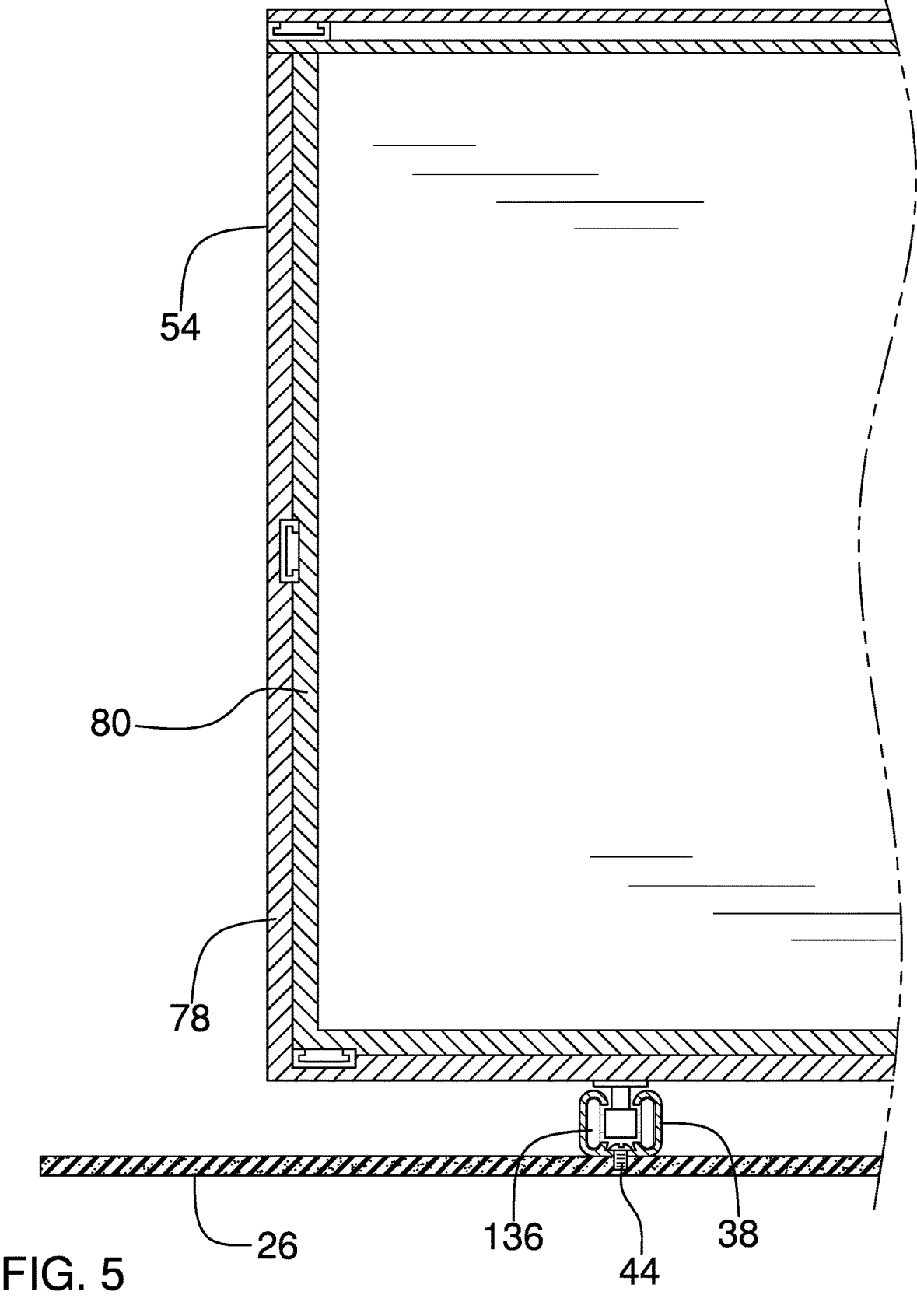
FIG. 5 is a cross-sectional view of an embodiment of the disclosure.
Figure 6:
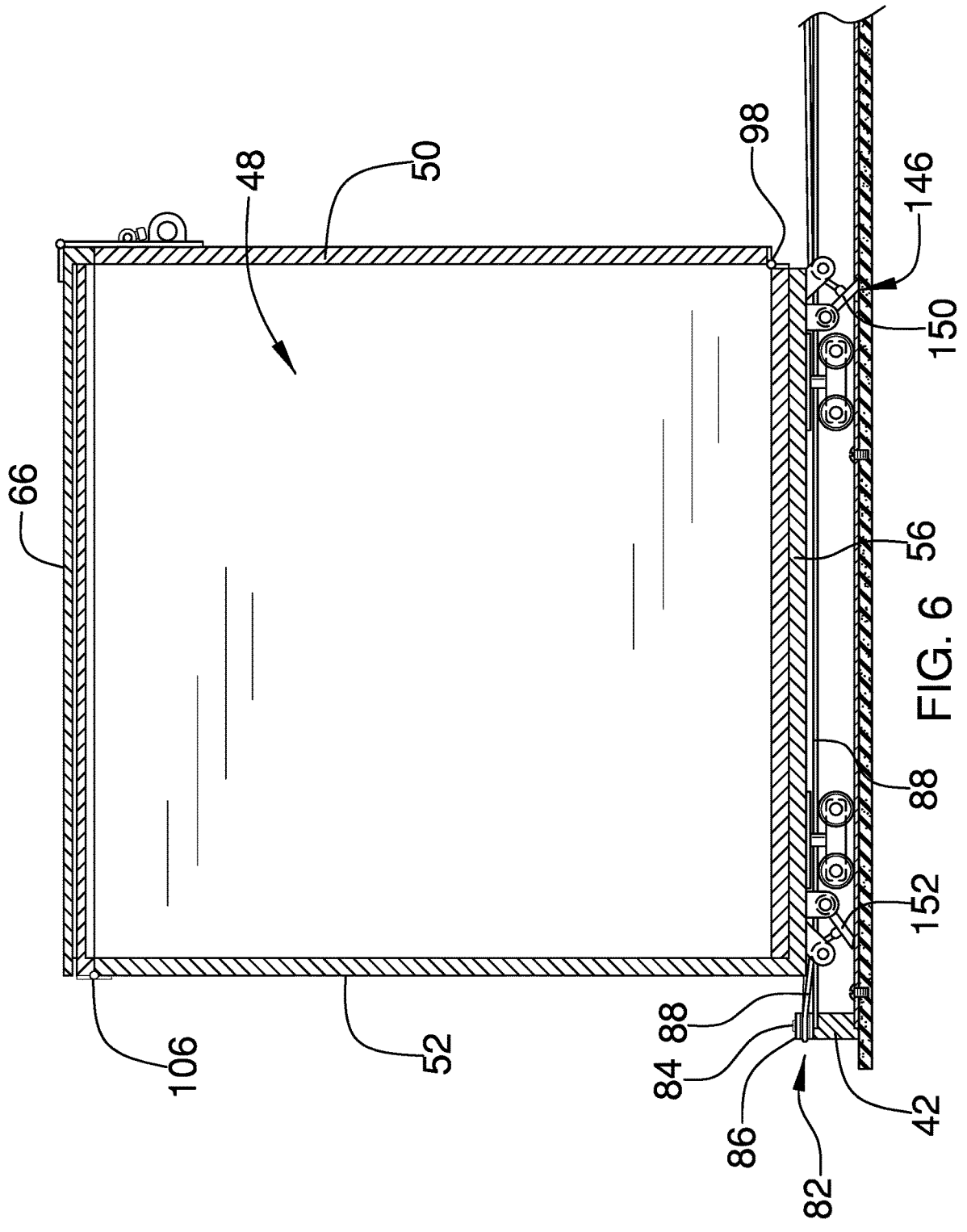
FIG. 6 is a cross-sectional view of an embodiment of the disclosure.
Figure 7:
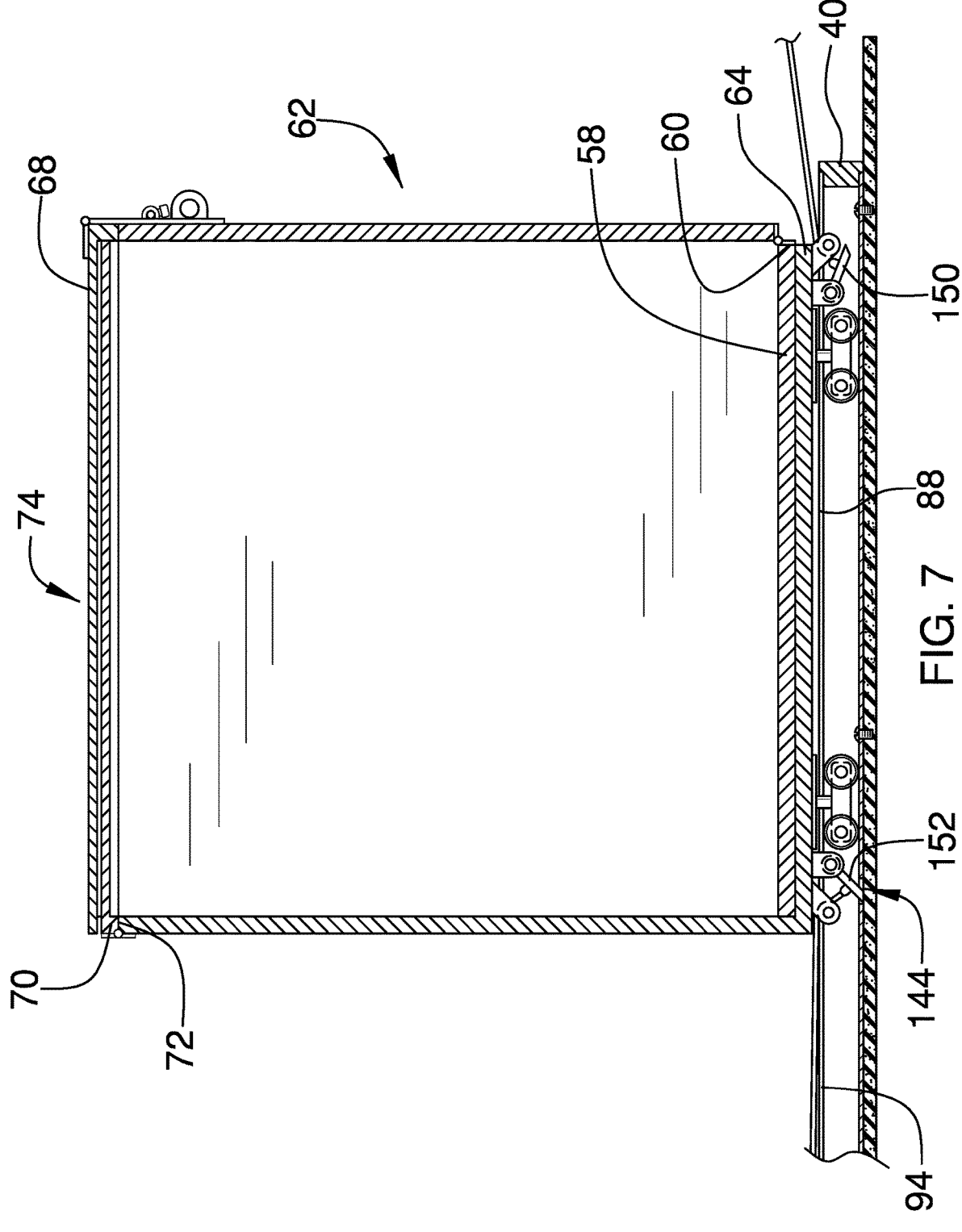
FIG. 7 is a cross-sectional view of an embodiment of the disclosure.

As shown in FIG. 4, there may be three telescopic slides of the plurality of telescopic slides 114 on each of the bottom panel 56 and the top panel 66, while there may be only a single telescopic slide of the plurality of telescopic slides 114 on each of the pair of lateral panels 76. Other embodiments may include two telescopic slides of the plurality of telescopic slides 114 on each of the bottom panel 56 and the top panel 66. Such configurations may facilitate extending the bottom panel 56 and the top panel 66, which may each be larger than the pair of lateral panels 76.

A pulley mechanism 82 is coupled to the container 46 and the pair of rails 38. The pulley mechanism 82 is configured to slide the container 46 along the pair of rails 38 between the front end 20 and the rear end 18 of the bed 14 of the pickup truck 12.

The pulley mechanism 82 may further comprise an axle 84 that is coupled to and extends outwardly from a first rail of the pair of rails 38. For example, the axle 84 may be positioned on the second end cap 42 of the first rail of the pair of rails 38, which is generally positioned near the rear end 18 of the bed 14, proximate to the cab 16 of the pickup truck 12.

A pulley wheel 86 may be rotatably coupled to the axle 84 wherein the pulley wheel 86 is configured to rotate around the axle 84 in a first direction and a second direction. For example, the first direction may be clockwise and the second direction may be counterclockwise.

A rope 88 may be coupled to the pulley wheel 86. The rope 88 may have a primary end 90, a secondary end 92, and an elongated body 94. The elongated body 94 is generally wrapped around the pulley wheel 86. The elongated body 94 has a length that is complementary to a distance between the front end 20 and the rear end 18 of the bed 14 of the pickup truck 12 such that the primary end 90 and the secondary end 92 of the rope 88 are both positionable adjacent to the front end 20 regardless of the position of the container 46 within the bed 14. For example, the length of the elongated body 94 may exceed the length of the bed 14, and in some embodiments the elongated body 94 of the rope 88 may be over twice as long as the length of the bed 14.

The rope 88 may rotate the pulley wheel 86 in the first direction when the primary end 90 is pulled, and the rope 88 may rotate the pulley wheel 86 in the second direction when the secondary end 92 is pulled. The rope 88 is generally coupled to an exterior surface 92 of the container 46. For example, the rope 88 may be coupled to the bottom panel 56 of the peripheral wall 54 of the container 46.

The pulley mechanism 82 may urge the container 46 forwardly toward the front end 20 of the bed 14 of the pickup truck 12 when the primary end 90 of the rope 88 is pulled. The pulley mechanism 82 may urge the container 46 backwardly toward the rear end 18 of the bed 14 of the pickup truck 12 when the secondary end 92 of the rope 88 is pulled.

A plurality of rollers 136 may be coupled to the exterior surface 96 of the bottom panel 56 of the peripheral wall 54 of the container 46. The plurality of rollers 136 is positionable on the pair of rails 38 to facilitate the container 46 in sliding along the pair of rails 38.

For example, the plurality of rollers 136 may further comprise a first pair of rollers 138 that is positioned adjacent to the first lateral panel 118 of the pair of lateral panels 76 of the peripheral wall 54 of the container 46. Each roller of the first pair of rollers 138 is generally aligned with the other between the front wall 50 and the back wall 52 of the container 46. The first pair of rollers 138 is configured to engage the first rail of the pair of rails 38.

A second pair of rollers 140 may be positioned adjacent to the second lateral panel 122 of the pair of lateral panels 76 of the peripheral wall 54 of the container 46. Each roller of the second pair of rollers 140 is generally aligned with the other between the front wall 50 and the back wall 52 of the container 46. The second pair of rollers 140 is configured to engage a second rail of the pair of rails 38.

A pair of grooves 142 may extend into one of the rails of the pair of rails 38. The pair of grooves 142 may further comprise a first groove 144 that is positioned proximate to the first end cap 40 of the rail of the pair of rails 38. A second groove 142 may be positioned proximate to the second end cap 42 of the rail of the pair of rails 38.

A pair of tongues 148 may be pivotably coupled to the exterior surface 96 of the bottom panel 56 of the peripheral wall 54 of the container 46. Each of the pair of tongues 148 is generally biased downwardly to engage a groove of the pair of grooves 142 to secure a position of the container 46 relative to the pair of rails 38. The pair of tongues 148 is coupled to the rope 88 of the pulley mechanism 82 wherein at least one of the pair of tongues 148 pivots upwardly toward the bottom panel 56 to disengage from the groove of the pair of grooves 142 when the rope 88 is pulled thereby releasing the position of the container 46 relative to the pair of rails 38.

The pair of tongues 148 may further comprise a first tongue 150 that is positioned proximate to the front wall 50 of the container 46. The first tongue 150 may be positioned adjacent to the first pair of rollers 138, so that the first tongue 150 is alignable with the pair of grooves 142 extending into the first rail of the pair of rails 38. The first tongue 150 may be configured to pivot upwardly when the primary end 90 of the rope 88 is pulled. The first tongue 150 may be configured to pivot downwardly to engage the second groove 146 when the primary end 90 of the rope 88 is released and when the container 46 is positioned at the rear end 18 of the bed 14 of the pickup truck 12. The first tongue 150 may accordingly be configured to secure the position of the container 46 near the second end cap 42 of the pair of rails 38, which is at the rear end 18 of the bed 14 of the pickup truck 12 when the mat 26 is positioned on the bed 14.

A second tongue 152 may be positioned proximate to the back wall 52 of the container 46. The second tongue 152 may be positioned adjacent to the first pair of rollers 138, so that the second tongue 152 is alignable with the pair of grooves 142 extending into the first rail of the pair of rails 38. The second tongue 152 may be configured to pivot upwardly when the secondary end 92 of the rope 88 is pulled. The second tongue 152 may be configured to pivot downwardly to engage the first groove 144 when the secondary end 92 of the rope 88 is released and when the container 46 is positioned at the front end 20 of the bed 14 of the pickup truck 12. The second tongue 152 may accordingly be configured to secure the position of the container 46 near the first end cap 40 of the pair of rails 38, which is at the front end 20 of the bed 14 of the pickup truck 12 when the mat 26 is positioned on the bed 14.

The pair of grooves 142 may be positioned on the same rail of the pair of rails 38 to which the axle 84 of the pulley mechanism 82 is coupled because the pair of grooves 142 is configured to engage and release one of the pair of tongues 148 to secure and release the position of the container 46 relative to the pair of rails 38 when the pulley mechanism 82 is actuated. Positioning the pair of grooves 142 and the pair of tongues 148 proximate to the pulley mechanism 82 may facilitate pivoting the pair of tongues 148 in and out of the pair of grooves 142 using the pulley mechanism 82.

Other embodiments may include a single tongue, rather than the pair of tongues 148 described above. The single tongue may be pivotably coupled to the exterior surface 96 of the bottom panel 56 of the peripheral wall 54 of the container 46. The single tongue is biased downwardly to engage a groove of the pair of grooves 142 to secure a position of the container 46 relative to the pair of rails 38, as described above. For example, the single tongue is coupled to the pulley mechanism 82 wherein the single tongue pivots upwardly toward the bottom panel 56 to disengage from the groove of the pair of grooves 142 when the pulley mechanism 82 is actuated thereby releasing the position of the container 46 relative to the pair of rails 38.

An insulating material 154 may be coupled to the container 46. The insulating material 154 is generally configured to insulate contents of the container 46 from outside temperatures. For example, if the contents of the container 46 include groceries, the insulating material 154 may be configured to insulate the groceries from outside temperatures while the groceries are transported. For example, the insulating material 154 may be positioned between the first bottom plate 58 and the second bottom plate 64 when the peripheral wall 54 of the container 46 is retracted. The insulating material 154 may be positioned between the first top plate 68 and the second top plate 70 when the peripheral wall 54 of the container 46 is retracted. The insulating material 154 may be positioned between the first side plate 78 and the second side plate 80 of each lateral panel of the pair of lateral panels 76 when the peripheral wall 54 is retracted. The insulating material 154 may also be positioned on the front wall 50 and the back wall 52, for example lining the interior surface 198 or the exterior surface 96 of the front wall 50 and the back wall 52.

Figure 8:
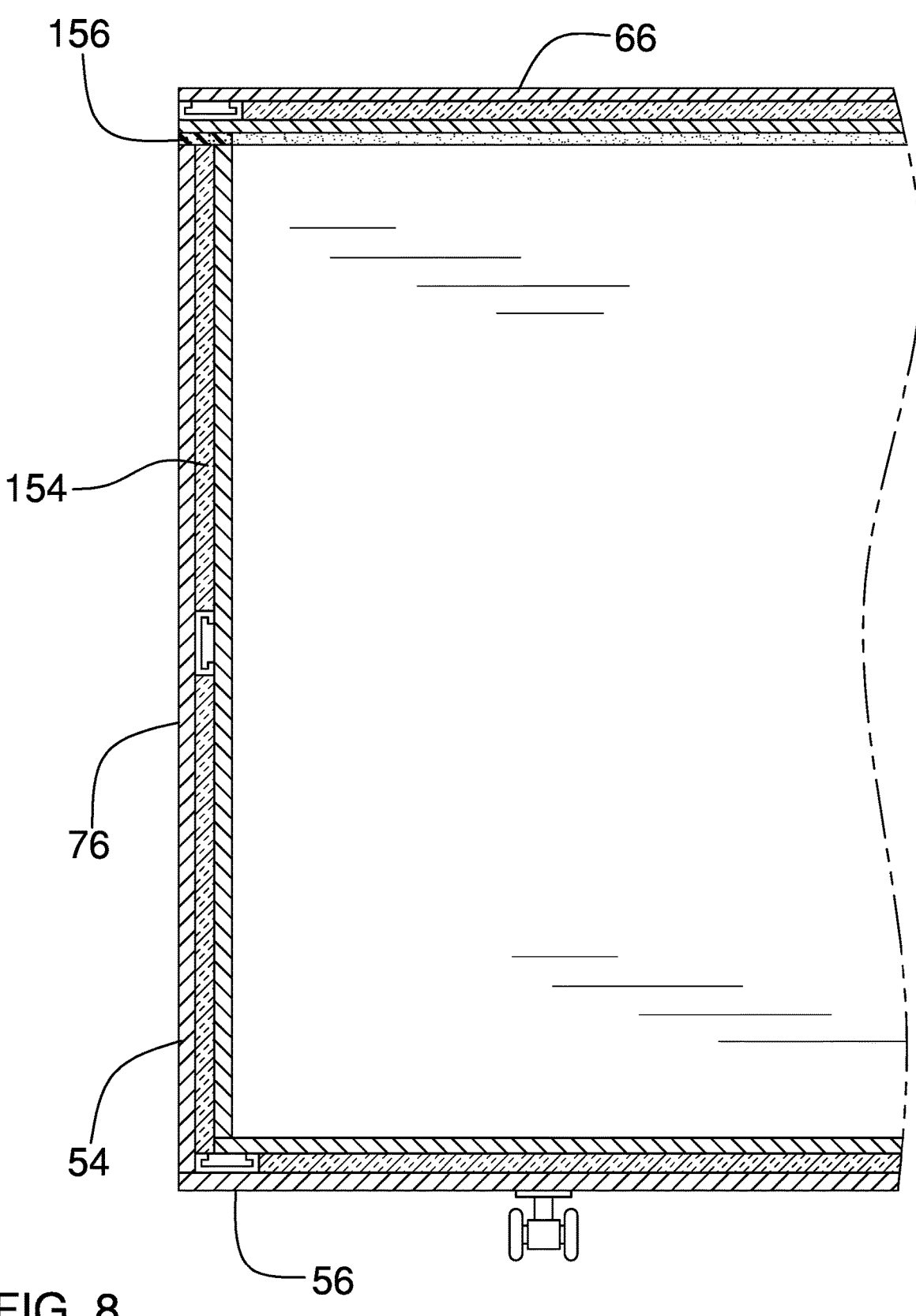
FIG. 8 is a cross-sectional view of an embodiment of the disclosure.

A seal 156 may be coupled to the container 46. For example, the seal 156 may be positioned at a junction between the top panel 66 of the peripheral wall 54 and the front wall 50. The seal 156 is generally configured to inhibit air transfer into the container 46 when the front wall 50 of the container 46 is closed and when the top panel 66 of the peripheral wall 54 of the container 46 is closed. The seal 156 can accordingly be configured to insulate the contents of the container 46 from outside temperatures. Some embodiments may include both the insulating material 154 and the seal 156, for example as shown in FIG. 8, so that the container 46 can function as a cooler to maintain the temperature of the contents of the container 46 while the contents are transported.

Figure 13:
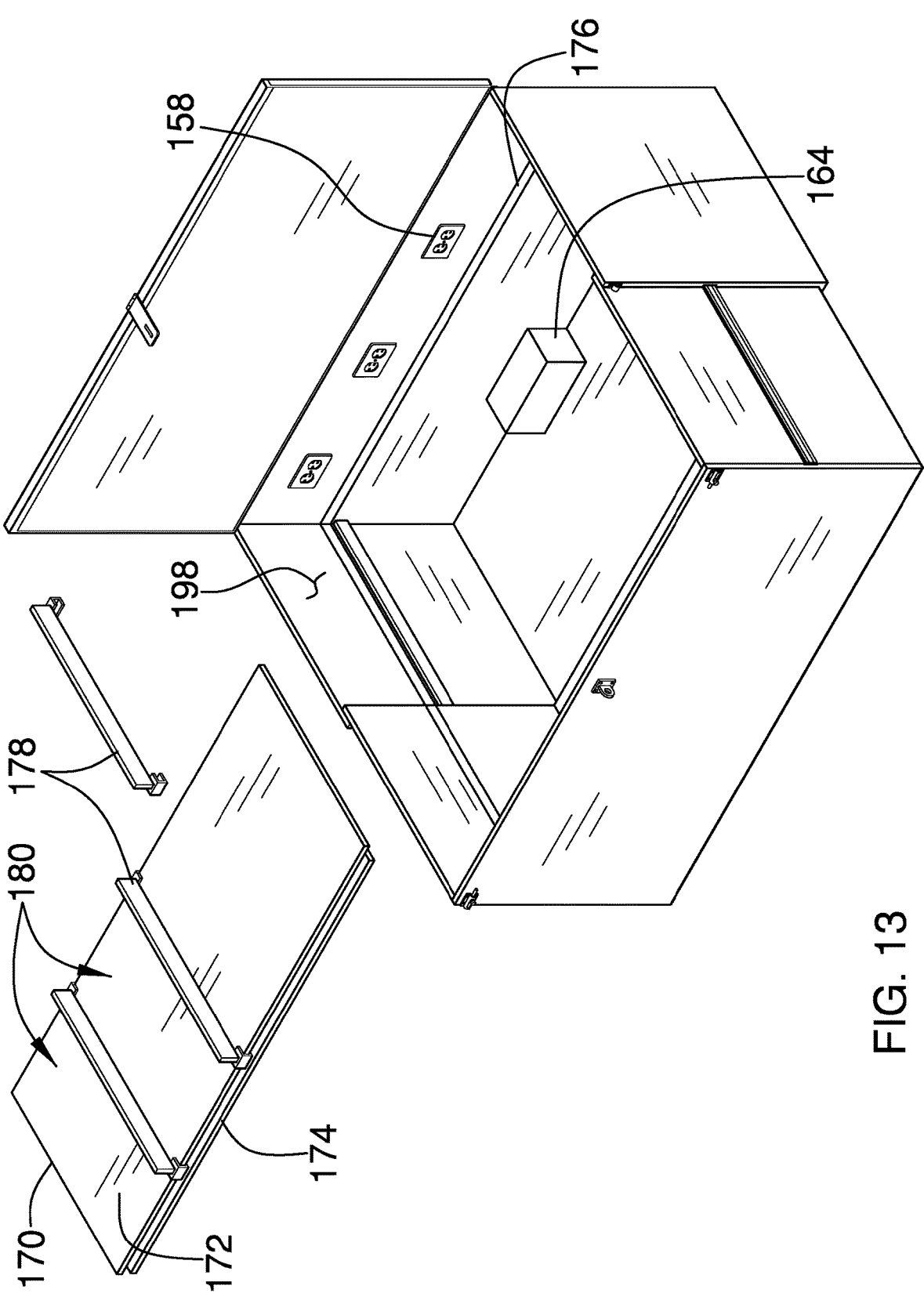
FIG. 13 is a front isometric view of an embodiment of the disclosure.
Figure 14:
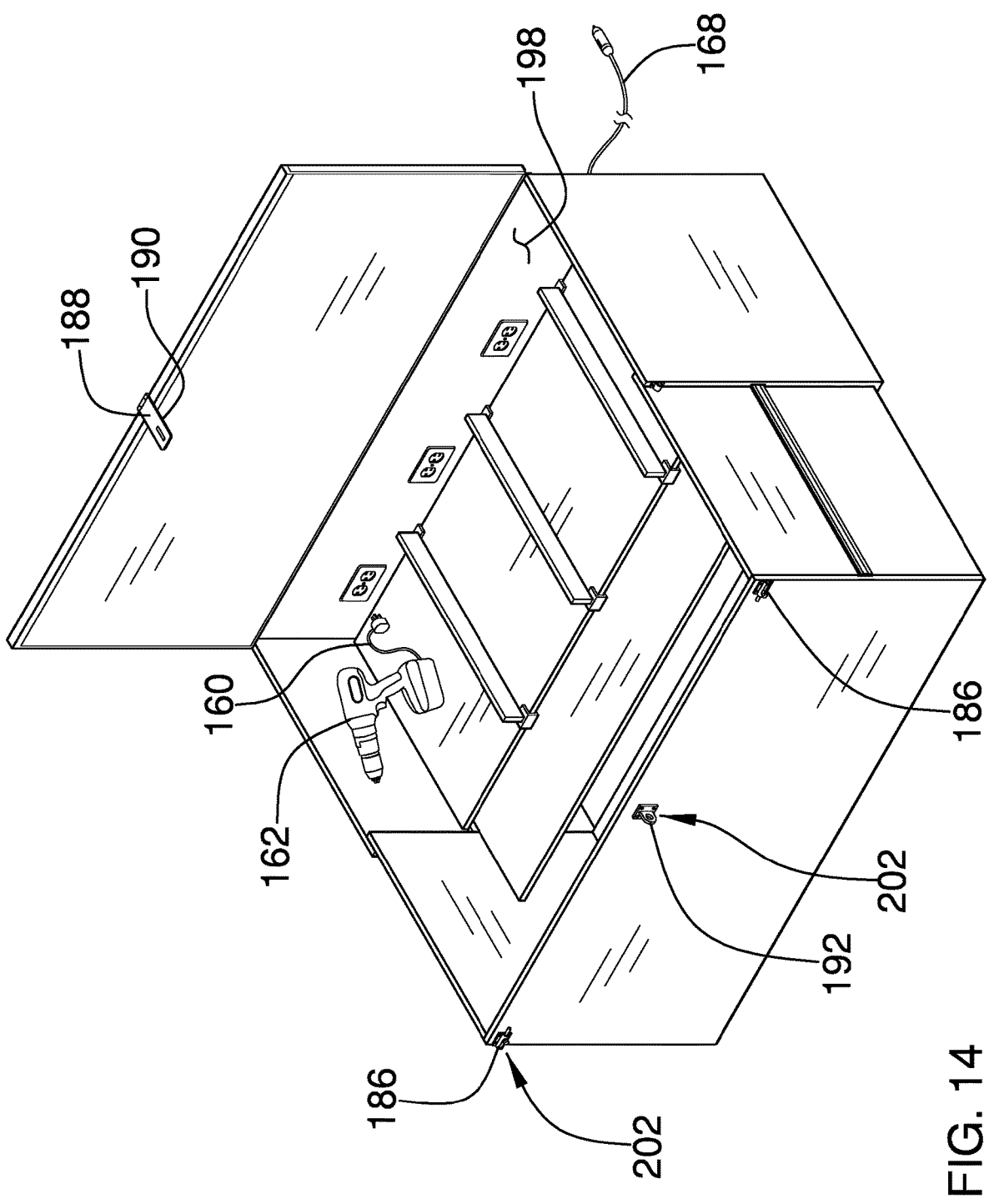
FIG. 14 is a front isometric view of an embodiment of the disclosure.
Figure 15:
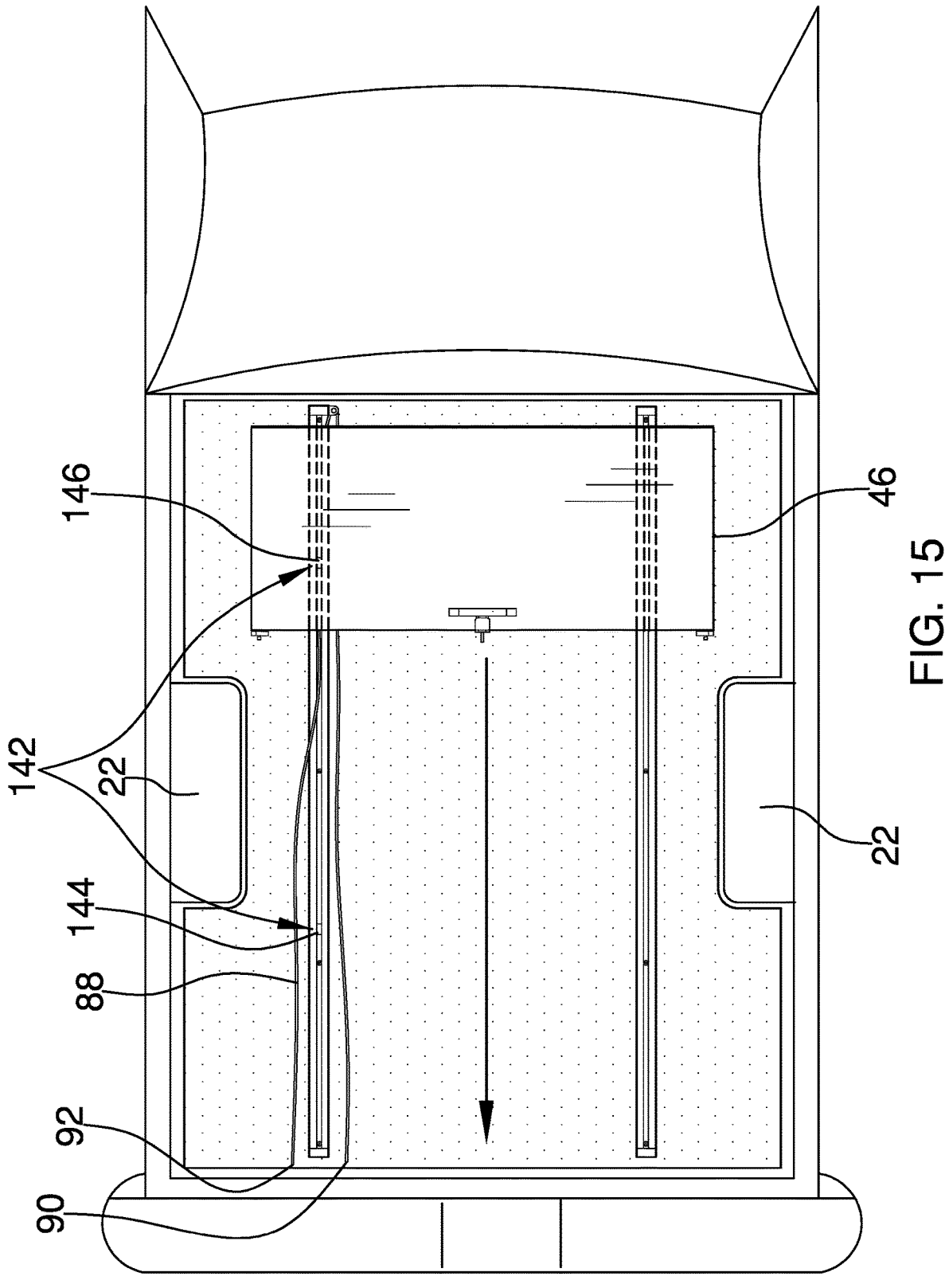
FIG. 15 is a top view of an embodiment of the disclosure.
Figure 16:
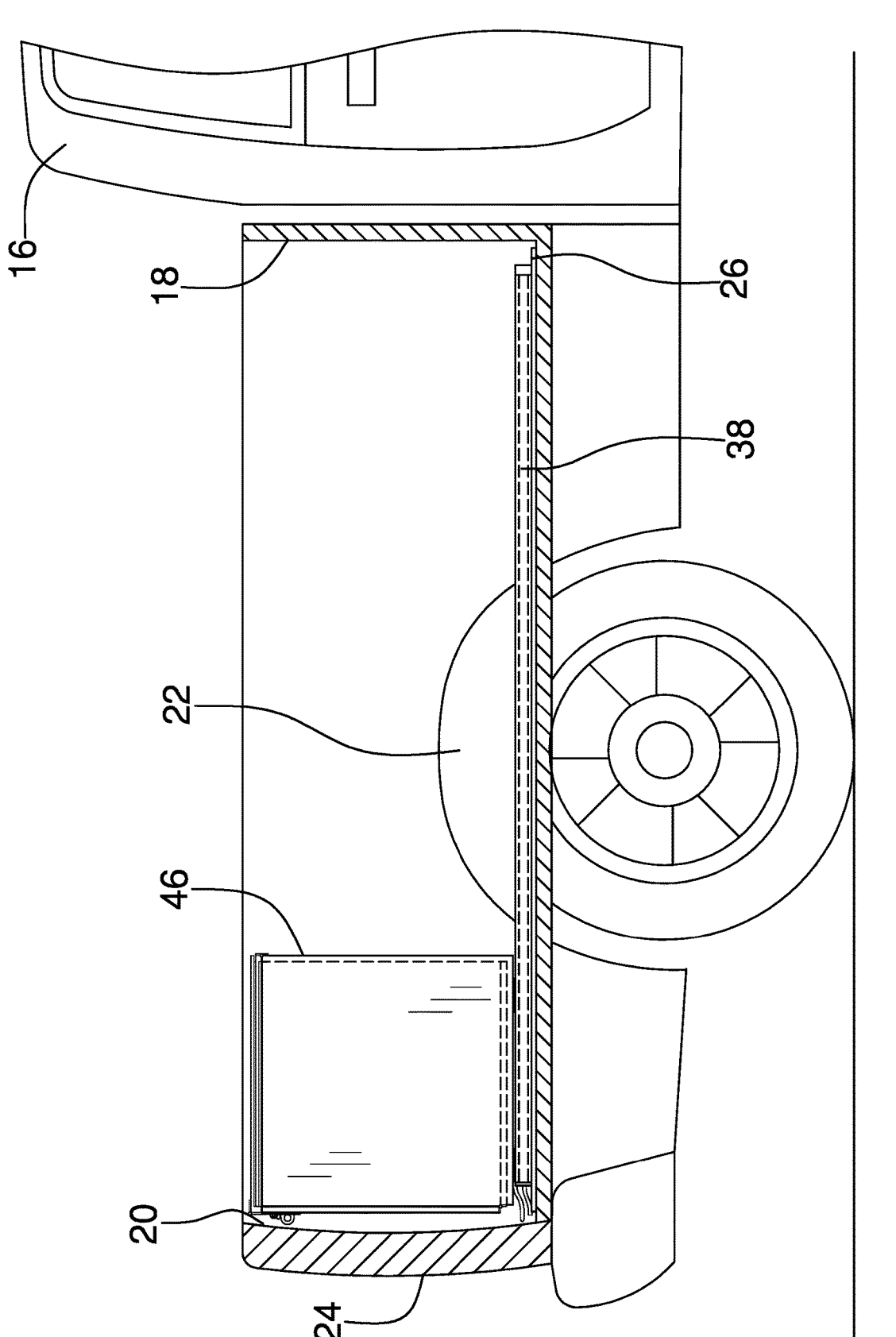
FIG. 16 is a side view of an embodiment of the disclosure.
Figure 17:
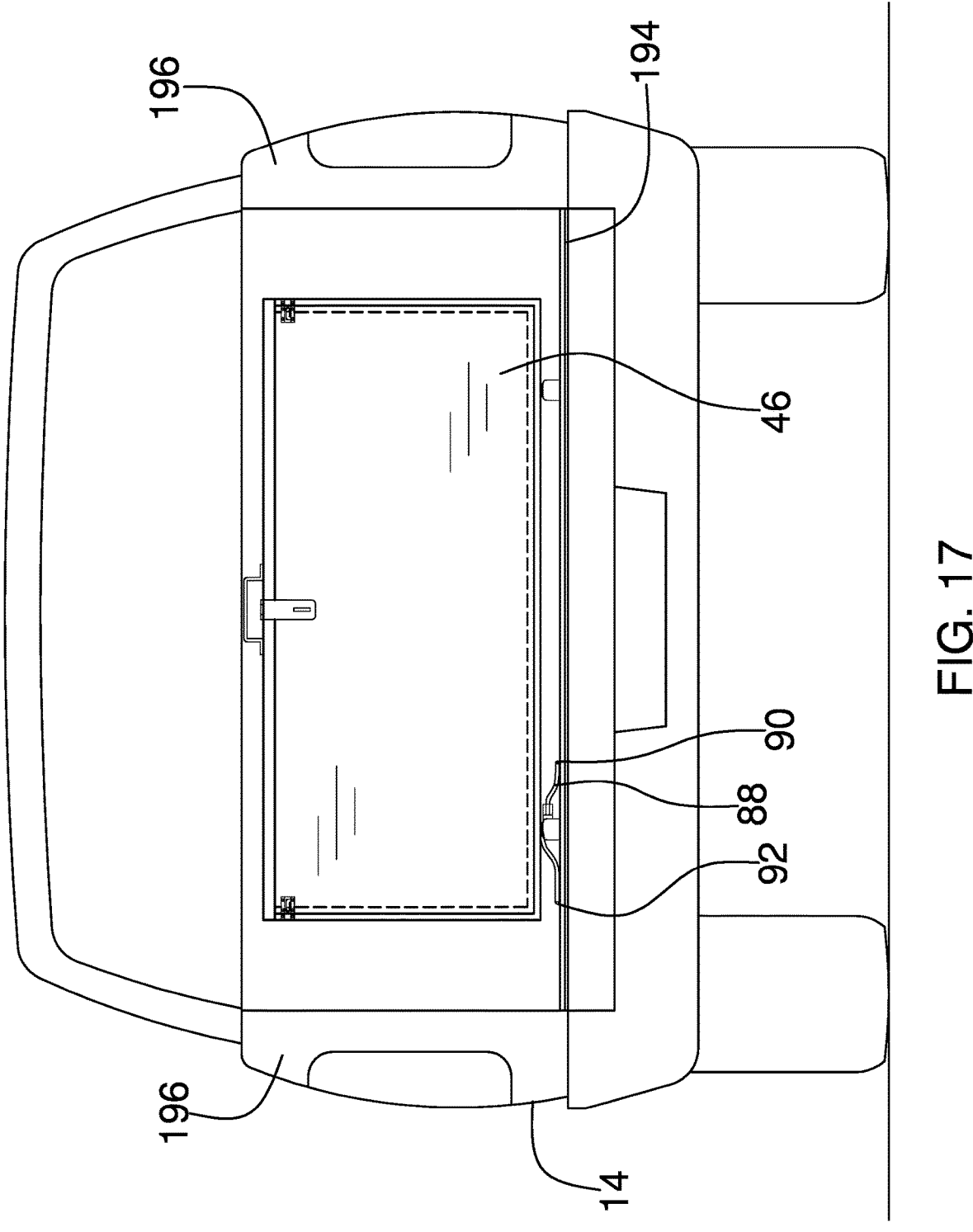
FIG. 17 is a rear view of an embodiment of the disclosure.
Figure 18:
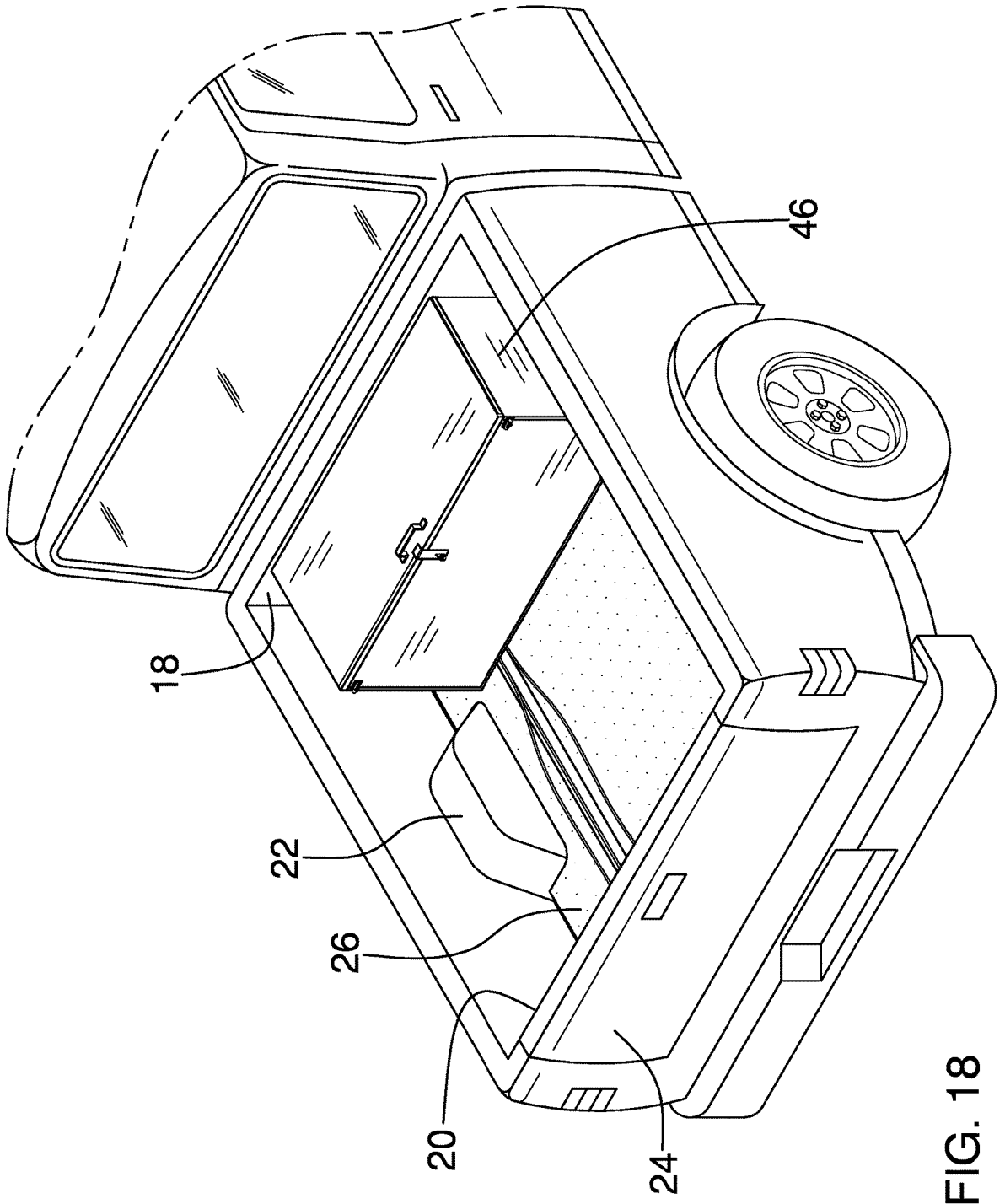
FIG. 18 is an in-use view of an embodiment of the disclosure.
Figure 19:
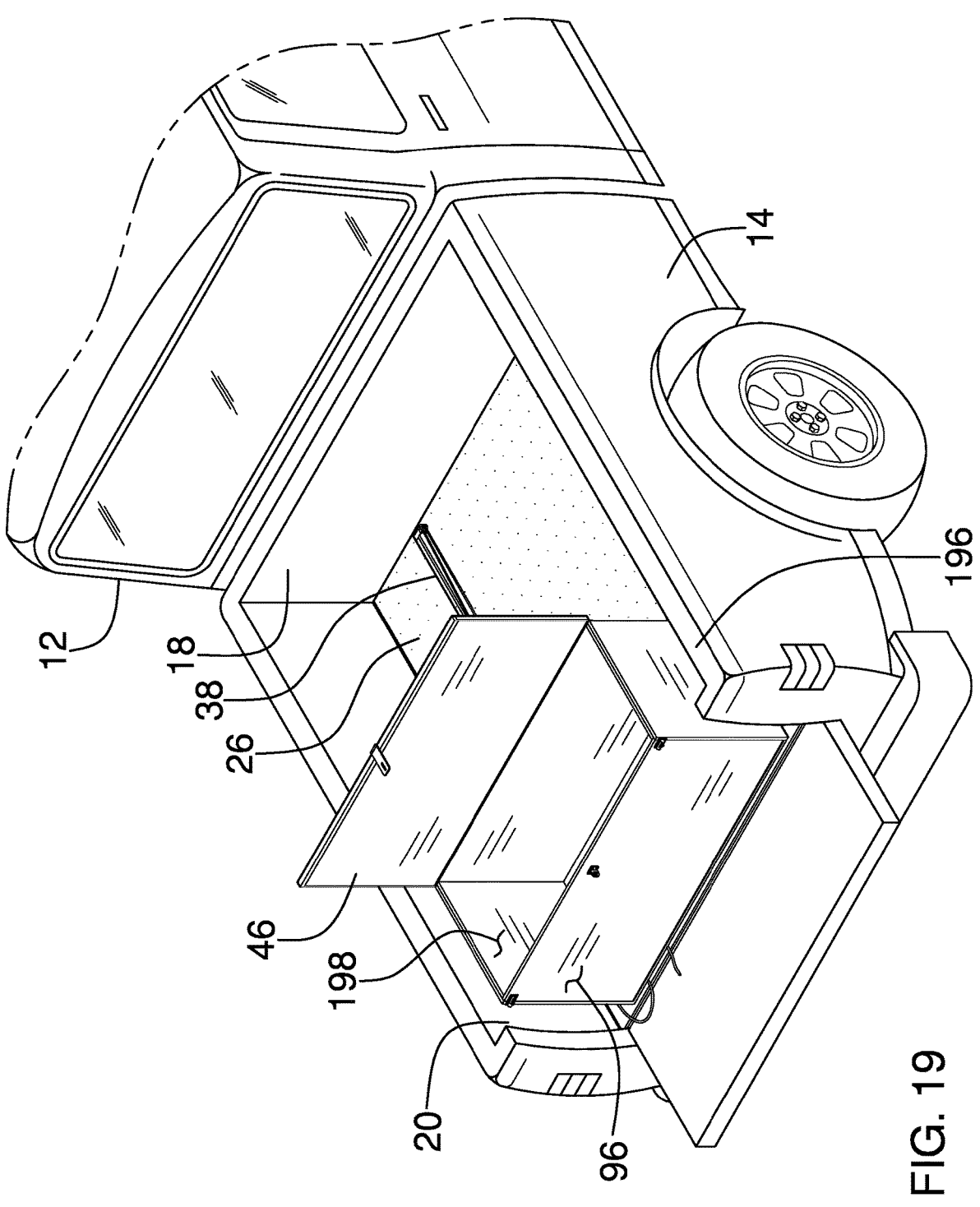
FIG. 19 is an in-use view of an embodiment of the disclosure.
Figure 20:
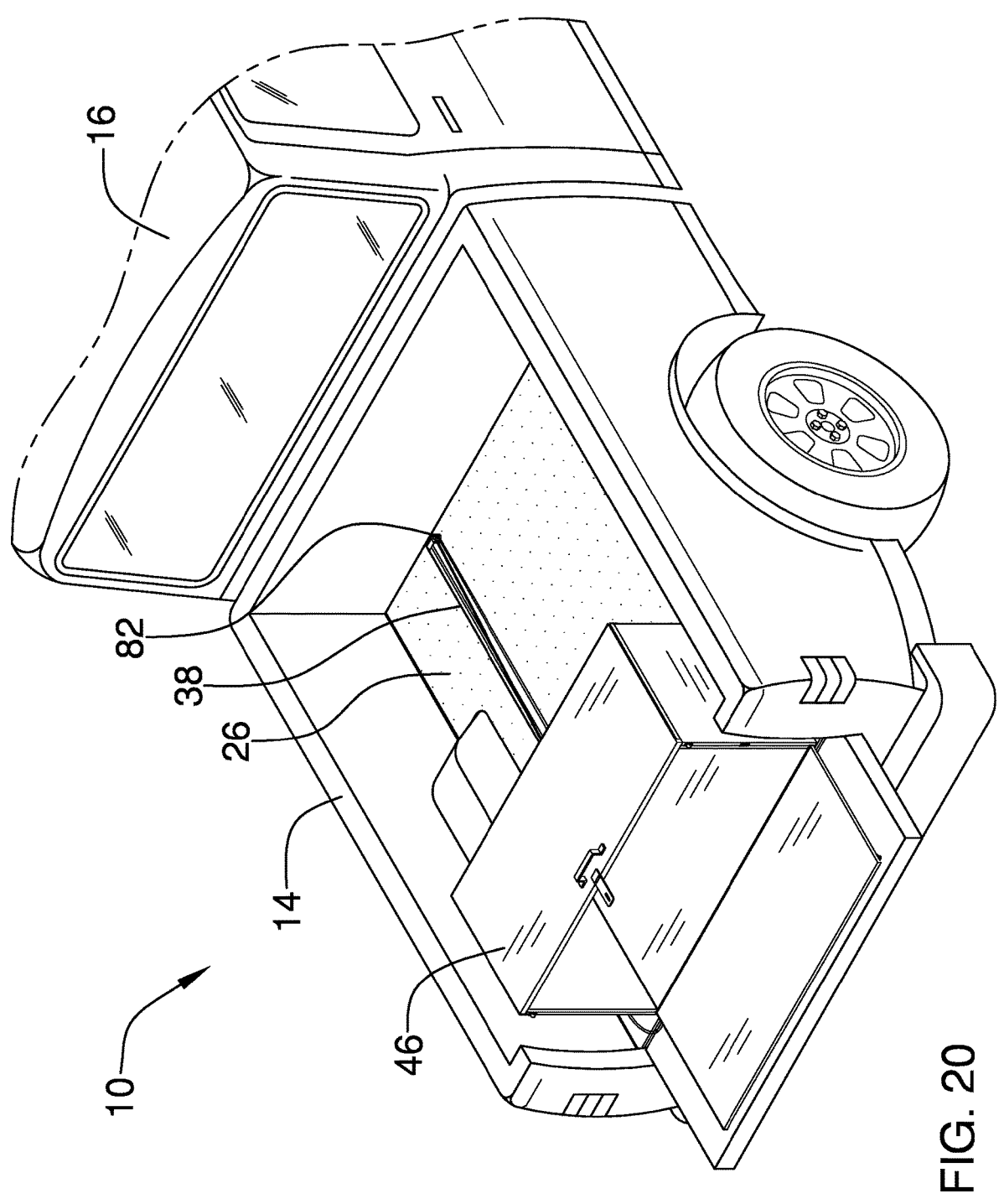
FIG. 20 is an in-use view of an embodiment of the disclosure.
Figure 21:
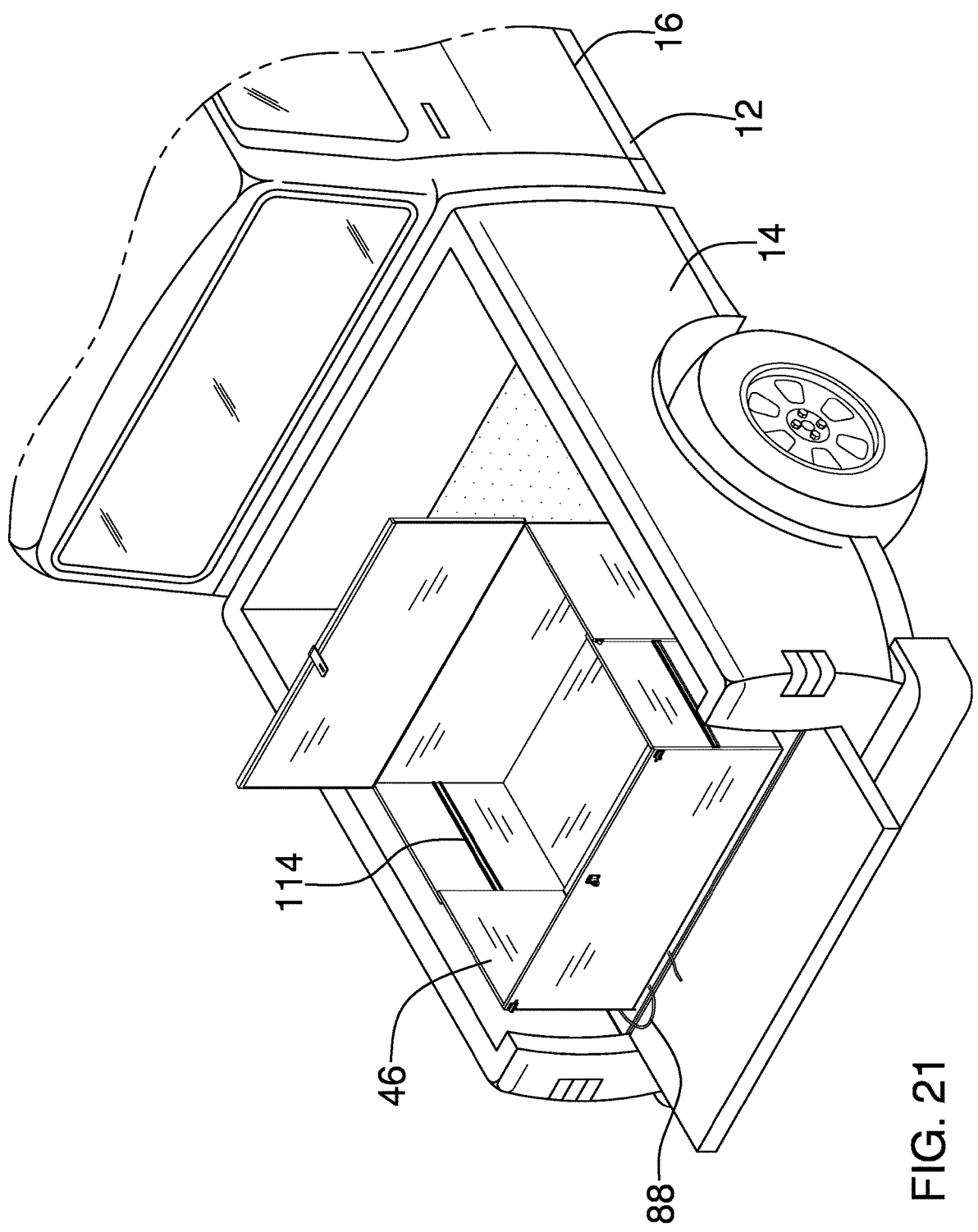
FIG. 21 is an in-use view of an embodiment of the disclosure.
Figure 22:
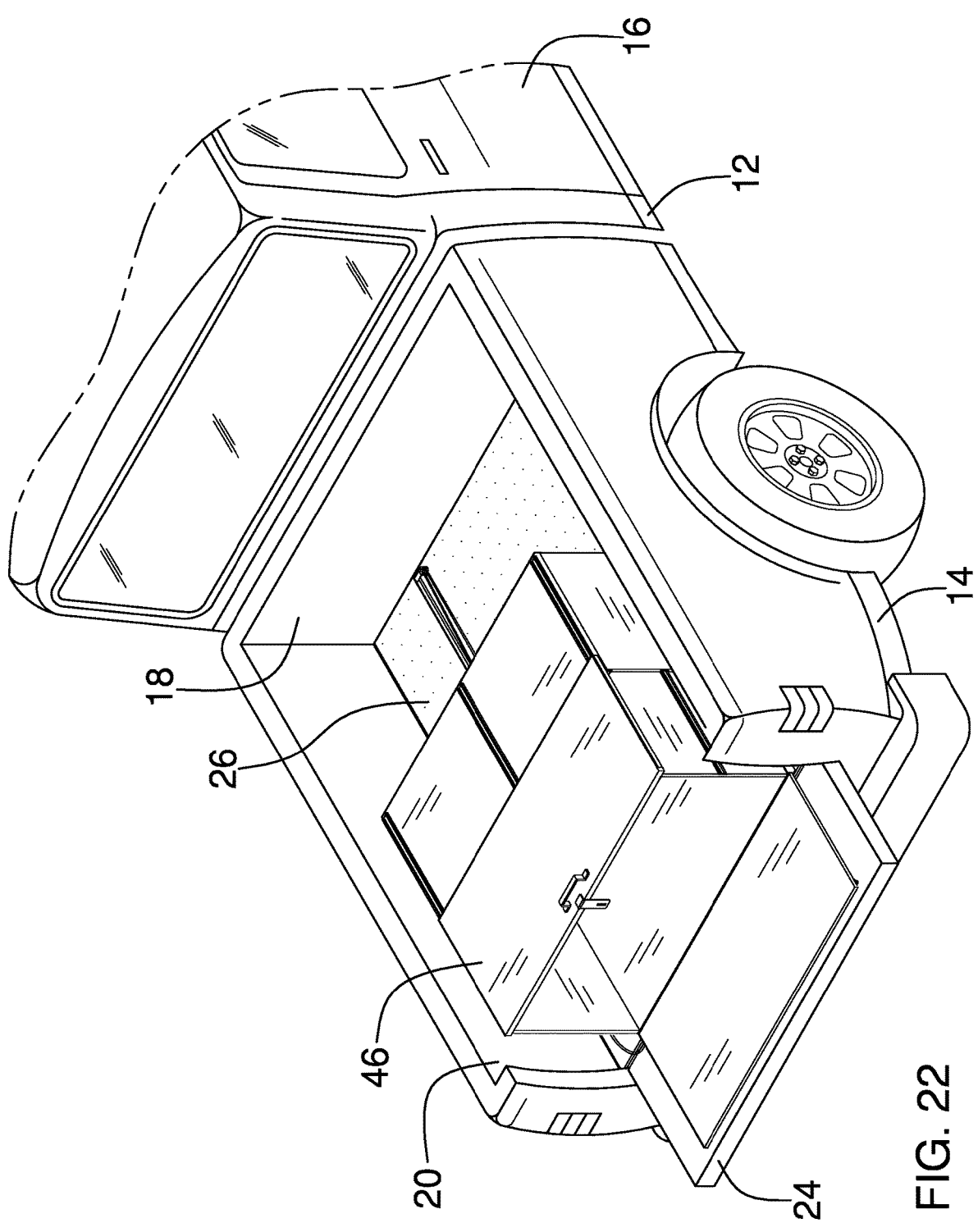
FIG. 22 is an in-use view of an embodiment of the disclosure.
Figure 23:
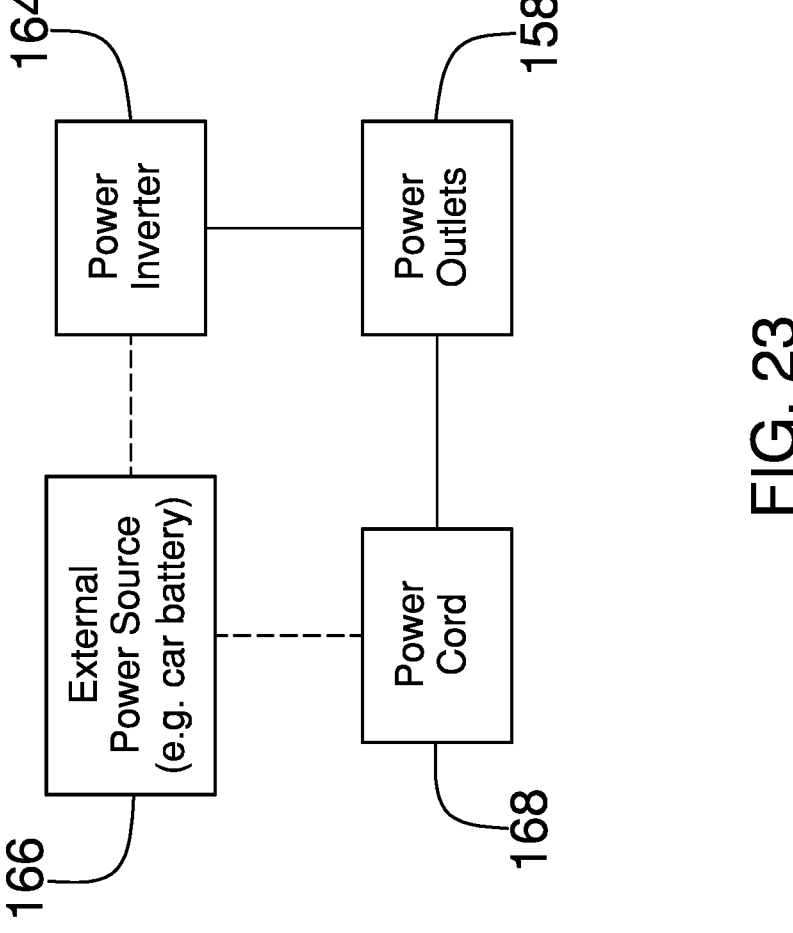
FIG. 23 is a block diagram view of an embodiment of the disclosure.

A plurality of power outlets 158 may be coupled to the back wall 52 of the container 46. The plurality of power outlets 158 is generally positioned in the interior space 48. For example, the plurality of power outlets 158 may be inset into the interior surface 198 of the back wall 52 and exposed within the interior surface 198 of the back wall 52, as shown in FIGS. 13 and 14. The plurality of power outlets 158 may be positioned on the back wall 52 because the back wall 52 does not expand or retract like the peripheral wall 54, and does not pivot between open and closed positions like the front wall 50. Each power outlet of the plurality of power outlets 158 is configured to receive a charging cord 160 for charging a power tool 162. Other electrical items may also be charged using the plurality of power outlets 158, either during transport or once the pickup truck 12 has reached its destination.

A power inverter 164 may be electrically coupled to the plurality of power outlets 158. The power inverter 164 may be coupled to an interior surface 198 of the container 46. For example, the power inverter 164 may be positioned adjacent to the back wall 52 of the container 46, so that the power inverter 164 is near the plurality of power outlets 158. The power inverter 164 is generally configured to direct power from an external power source 166 to the plurality of power outlets 158. For example, the external power source 166 may comprise a car battery of the pickup truck 12.

In other embodiments, the power inverter 164 may be external to the container 46. For example, the power inverter 164 may be built into the pickup truck 12 or retrofitted into the pickup truck 12, instead of being coupled to the container 46.

A power cord 168 may be electrically coupled to the plurality of power outlets 158 and configured to engage the power inverter 164. The power cord 168 is generally electrically coupled to the power inverter 164 when the power cord 168 engages the power inverter 164. The power cord 168 may be coupled to and extend outwardly from the back wall 52 of the container 46. The power cord 168 may be positioned on the back wall 52 so that the power cord is proximate to the plurality of power outlets 158 and because the back wall 52 does not expand, retract, or pivot open. The power cord 168 is configured to engage the external power source 166, such as the car battery or the power inverter 164, for transferring power to the plurality of power outlets 158. In embodiments that include the power inverter 164 that is coupled to the container 46, the power cord 168 may also be configured to transfer power to the power inverter 164 from the car battery or other external power source 166.

A shelf 170 may be positionable in the interior space 48 of the container 46. The shelf 170 is removably couplable to the back wall 52 of the container 46, which is stable and does not expand, retract, or pivot open. The shelf 170 may also be removably couplable to the peripheral wall 54 of the container 46, for example to increase the weight capacity of the shelf 170 or to stabilize the position of the shelf 170 relative to the peripheral wall 54.

The shelf 170 may be expandable, similar to the peripheral wall 54 of the container 46. For example, the shelf 170 may further comprise an upper board 172 and a lower board 174 that is movably coupled to the upper board 172. The lower board 174 slides outwardly from beneath the upper board 172 to expand a surface area of the shelf 170. In such embodiments, the shelf 170 is configured to extend from the back wall 52 of the container 46 to the front wall 50 of the container 46 when the peripheral wall 54 of the container 46 is expanded.

A slot 176 may extend into the back wall 52 of the container 46. The slot 176 may also extend into the peripheral wall 54 of the container 46. More specifically, the slot 176 may extend into the pair of lateral panels 76 of the peripheral wall 54 of the container 46. The slot 176 is positioned in the interior space 48. The slot 176 has a shape that is complementary to a shape of the shelf 170 wherein the shelf 170 is positionable within and engageable with the slot 176 to couple the shelf 170 to the back wall 52, and potentially the peripheral wall 54 of the container 46. The slot 176 may be positioned below the plurality of power outlets 158 wherein the plurality of power outlets 158 are configured to be positioned above the shelf 170 when the shelf 170 is positioned within the slot 176.

A plurality of dividers 178 may be removably couplable to the shelf 170. For example, the plurality of dividers 178 may be positionable on the upper board 172. The plurality of dividers 178 may extend upwardly from the shelf 170 to define a plurality of sections 180 on the shelf 170. The plurality of sections 180 may be used to organize contents of the container 46.

A plurality of locks 182 may be coupled to the container 46. Each lock of the plurality of locks 182 is generally positionable in a locked condition 184 when each of the front wall 50 and the top panel 66 of the peripheral wall 54 are closed to inhibit either the front wall 50 or the top panel 66 from being opened. Each lock of the plurality of locks 182 is generally positionable in an unlocked condition 202 to facilitate the front wall 50 and the top panel 636 of the peripheral wall 54 in being opened.

The plurality of locks 182 may further comprise a pair of side locks 186 releasably coupling the front wall 50 to the pair of lateral panels 76 to inhibit the front wall 50 from being opened. For example, the pair of side locks 186 may be positioned on the front wall 50 proximate to each of the pair of lateral panels 76. Each side lock of the pair of side locks 186 may further comprise one of a lever handle lock, a barrel bolt, and a chain lock.

A top lock 188 may releasably couple the top panel 66 to the front wall 50 to inhibit the top panel 66 from being opened. The top lock 188 may be positioned on the top panel 66 of the peripheral wall 54 and on the front wall 50 of the container 46. For example, the top lock 188 may further comprise a latch 190 that is coupled to the top panel 66 and an engagement 192 that is coupled to the front wall 50. The latch 190 releasably engages the engagement 192 when the top lock 188 is positioned in the locked condition 202.

In use, the container 46 and the mat 26 are each removably positionable in the bed 14 of the pickup truck 12. When the user wants to use the container 46 to organize or transport items, the user can simply lay the mat 26 over the bed 14 of the pickup truck 12 and place the container 46 on the pair of rails 38. The user can actuate the pulley mechanism 82 to move the container between the front end 20 and the rear end 18 of the pickup truck 12. When the mat 26 and the container 46 are positioned on the bed 14, the user does not need to climb into the bed 14 to organize items or load items for transport. Instead, the user can merely pull the rope 88 to move the container 46 to the front end 20 and load the container 46 there. The pair of tongues 148 can engage the pair of grooves 142 to keep the container 46 positioned at either the front end 20 or the rear end 18 of the bed 14 of the pickup truck 12. When more items, or larger items, are being transported, the peripheral wall 54 may be extended to increase the volume, and carrying capacity, of the container 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A storage system comprising:
   a pickup truck having a bed extending outwardly from a cab, the bed having a rear end being positioned adjacent to the cab and a front end being spaced from the rear end;

a mat being removably positionable on the bed of the pickup truck, the mat extending between the front end and the rear end of the bed of the pickup truck;

a pair of rails being coupled to the mat, the pair of rails extending between the front end and the rear end of the bed of the pickup truck when the mat is positioned on the bed of the pickup truck;

a container being positionable in the bed of the pickup truck, the container being movably coupled to the pair of rails wherein the container is slidable along the pair of rails between the front end and the rear end of the bed of the pickup truck, the container having an interior space, the container further comprising:

a front wall being openable to facilitate access to the interior space;

a back wall being parallel to the front wall, the back wall being spaced from the front wall;

a peripheral wall being coupled to and extending between the front wall and the back wall to define the interior space, the peripheral wall being expandable and retractable to selectively adjust a volume of the interior space; and a pulley mechanism being coupled to the container and the pair of rails, the pulley mechanism being actuatable to slide the container along the pair of rails between the front end and the rear end of the bed of the pickup truck.

2. The storage system of claim 1, further comprising:

a first end cap being coupled to each rail of the pair of rails, the first end cap being proximate to the front end of the bed of the pickup truck when the mat is positioned on the bed of the pickup truck;

a second end cap being coupled to each rail of the pair of rails, the second end cap being spaced from the first end cap, the second end cap being positioned proximate to the rear end of the bed of the pickup truck when the mat is positioned on the bed of the pickup truck;

a pair of grooves extending into a first rail of the pair of rails, the pair of grooves further comprising:

a first groove being positioned proximate to the first end cap of the first rail of the pair of rails;

a second groove being positioned proximate to the second end cap of the first rail of the pair of rails; and a tongue being pivotably coupled to an exterior surface of the bottom panel of the peripheral wall of the container, the tongue being biased downwardly to engage a groove of the pair of grooves to secure a position of the container relative to the pair of rails, the tongue being coupled to the pulley mechanism wherein the tongue pivots upwardly toward the bottom panel to disengage from the groove of the pair of grooves when the pulley mechanism is actuated thereby releasing the position of the container relative to the pair of rails.

3. The storage system of claim 1, the peripheral wall of the container further comprising:

a bottom panel being perpendicular to each of the front wall and the back wall, the bottom panel being positioned adjacent to the pair of rails;

a top panel being distally positioned to the bottom panel on each of the front wall and the back wall; and a pair of lateral panels being parallel with each other, the pair of lateral panels being aligned with opposing lateral sides of the bed of the pickup truck when the container is positioned in the bed of the pickup truck.

4. The storage system of claim 3, the bottom panel further comprising:

a first bottom plate being coupled to the front wall, the first bottom plate extending outwardly from the front wall toward the back wall, the first bottom plate having a terminal edge being pivotably coupled to the front wall of the container wherein the front wall of the container is configured to pivot downwardly from the peripheral wall to permit access to the interior space; and a second bottom plate being coupled to the back wall, the second bottom plate extending outwardly from the back wall toward the front wall, the second bottom plate being slidably coupled to the first bottom plate wherein the second bottom plate slides outwardly from the first bottom plate when the peripheral wall is expanded and wherein the second bottom plate is positioned beneath the first bottom plate when the peripheral wall is retracted.

5. The storage system of claim 4, further comprising a front hinge pivotably coupling the first bottom plate of the bottom panel of the peripheral wall to the front wall of the container, wherein the front hinge is configured to facilitate the front wall of the container in pivoting 180.0° relative to the terminal edge of the first bottom plate wherein the front wall is pivotable between a primary open position, a secondary open position, and a shut position, the primary open position being parallel to the secondary open position, the primary open position being perpendicular to the shut position.

6. The storage system of claim 3, the top panel further comprising:

a first top plate being coupled to the front wall, the first top plate extending outwardly from the front wall toward the back wall, the first top plate being releasably coupled to the front wall wherein the first top plate is detached from the front wall when the front wall is opened; and a second top plate being coupled to the back wall, the second top plate extending outwardly from the back wall toward the front wall, the second top plate being slidably coupled to the first top plate wherein the second top plate slides outwardly from the first top plate when the peripheral wall is expanded and wherein the second top plate is positioned beneath the first top plate when the peripheral wall is retracted.

7. The storage system of claim 6, wherein the top panel is openable to facilitate access to the interior space, the second top plate of the top panel being pivotably coupled to an upper edge of the back wall wherein the second top plate is configured to pivot upwardly from the back wall to permit access to the interior space.

8. The storage system of claim 7, further comprising a top hinge pivotably coupling the second top plate of the top panel of the peripheral wall to the back wall of the container, wherein the top hinge is configured to facilitate the top panel of the peripheral wall of the container in pivoting 270° relative to the upper edge of the back wall of the container wherein the top panel is pivotable between a first open position, a second open position, and a closed position, wherein the first open position is perpendicular to the closed position and wherein the second open position is parallel to the first open position.

9. The storage system of claim 3, each lateral panel of the pair of lateral panels further comprising:

a first side plate being coupled to and extending upwardly from the bottom panel toward the top panel;

a second side plate being coupled to and extending upwardly from the second bottom plate of the bottom panel toward the top panel, the second side plate being slidably coupled to the first side plate wherein the second side plate slides outwardly from the first side plate when the peripheral wall is expanded and wherein the second side plate is positioned over the first side plate when the peripheral wall is retracted.

10. The storage system of claim 1, the pulley mechanism further comprising:

an axle being coupled to and extending outwardly from a first rail of the pair of rails;

a pulley wheel being rotatably coupled to the axle wherein the pulley wheel is configured to rotate around the axle in a first direction and a second direction; and a rope being coupled to the pulley wheel, the rope having a primary end, a secondary end, and an elongated body, the elongated body being wrapped around the pulley wheel, wherein the rope rotates the pulley wheel in the first direction when the primary end is pulled and wherein the rope rotates the pulley wheel in the second direction when the secondary end is pulled, the rope being coupled to an exterior surface of the container wherein the pulley mechanism urges the container forwardly toward the front end of the bed of the pickup truck when the primary end is pulled and wherein the pulley mechanism urges the container backwardly toward the rear end of the bed of the pickup truck when the secondary end is pulled.

11. The storage system of claim 1, further comprising a plurality of telescopic slides being coupled to the peripheral wall of the container wherein the plurality of telescopic slides is configured to facilitate expansion and retraction of the peripheral wall of the container.

12. The storage system of claim 1, further comprising a plurality of rollers being coupled to an exterior surface of the peripheral wall of the container, the plurality of rollers being positionable on the pair of rails to facilitate the container in sliding along the pair of rails.

13. The storage system of claim 1, further comprising an insulating material being coupled to the container, the insulating material being configured to insulate contents of the container from outside temperatures.

14. The storage system of claim 1, further comprising a seal being coupled to the container, the seal being configured to inhibit air transfer into the container when the front wall of the container is closed.

15. The storage system of claim 1, further comprising a plurality of power outlets being coupled to the back wall of the container, the plurality of power outlets being positioned in the interior space, each power outlet of the plurality of power outlets being configured to receive a charging cord for charging a power tool.

16. The storage system of claim 15, further comprising a power cord being electrically coupled to the plurality of power outlets, the power cord being coupled to and extending outwardly from the back wall of the container, the power cord being configured to engage an external power source for transferring power to the plurality of power outlets.

17. The storage system of claim 1, further comprising a shelf being positionable in the interior space of the container, the shelf being removably couplable to the back wall of the container.

18. The storage system of claim 17, the shelf further comprising:

an upper board; and a lower board being movably coupled to the upper board wherein the lower board slides outwardly from beneath the upper board to expand a surface area of the shelf whereby the shelf is configured to extend from the back wall of the container to the front wall of the container when the peripheral wall of the container is expanded.

19. The storage system of claim 17, further comprising a slot extending into the back wall of the container, the slot being positioned in the interior space, the slot having a shape being complementary to a shape of the shelf wherein the shelf is positionable within the slot to couple the shelf to the back wall of the container.

20. A storage system comprising:

a pickup truck having a bed extending outwardly from a cab, the bed having a rear end being positioned adjacent to the cab and a front end being spaced from the rear end, the bed having a base wall and a side wall being coupled to and extending upwardly from the base wall, the pickup truck further comprising:

a pair of wheel wells being coupled to and extending upwardly from the base wall of the bed, each wheel well of the pair of wheel wells being positioned on opposing lateral sides of the side wall, the pair of wheel wells being aligned with each other across the base wall of the bed;

a tailgate being coupled to the side wall of the bed, the tailgate being positioned on the front end of the bed, the tailgate being openable to facilitate access to the bed of the pickup truck;

a mat being removably positionable on the base wall of the bed of the pickup truck, the mat extending between the front end and the rear end of the bed of the pickup truck, the mat having a forward edge, a rearward edge, and a pair of lateral edges being coupled to and extending between the forward edge and the rearward edge, the mat comprising a flexible material wherein the mat is configured to be foldable into a storage configuration when the mat is removed from the base wall of the bed of the pickup truck, the flexible material comprising rubber, the mat further comprising:

a pair of cutouts extending into the pair of lateral edges, the pair of cutouts being aligned with the pair of wheel wells of the pickup truck wherein the pair of wheel wells are positioned within the pair of cutouts when the mat is positioned on the base wall of the bed of the pickup truck;

a pair of rails being removably coupled to the mat, the pair of rails extending between the forward edge and the rearward edge of the mat, the pair of rails being parallel to each other, each rail of the pair of rails being parallel to the pair of lateral edges of the mat, each rail of the pair of rails being positioned proximate to an associated lateral edge of the pair of lateral edges, each rail of the pair of rails further comprising:

a first end cap being positioned proximate to the forward edge of the mat;

a second end cap being positioned proximate to the rearward edge of the mat;

a plurality of fasteners removably coupling each rail of the pair of rails to the mat, each fastener of the plurality of fasteners comprising a screw;

a container being positionable in the bed of the pickup truck, the container being movably coupled to the pair of rails wherein the container is slidable along the pair of rails between the front end and the rear end of the bed of the pickup truck, the container being removably coupled to the pair of rails wherein the container is removable from the pair of rails, the container having a height being less than a height of the side wall of the bed of the pickup truck, the container having an interior space, the container further comprising:

a front wall being openable to facilitate access to the interior space, the front wall being aligned with the tailgate of the pickup truck when the container is positioned at the front end of the bed of the pickup truck;

a back wall being parallel to the front wall, the back wall being spaced from the front wall;

a peripheral wall being coupled to and extending between the front wall and the back wall to define the interior space, the peripheral wall being expandable and retractable to selectively adjust a volume of the interior space, the peripheral wall further comprising:

a bottom panel being perpendicular to each of the front wall and the back wall, the bottom panel being positioned adjacent to the pair of rails when the container is coupled to the pair of rails, the bottom panel further comprising:

a first bottom plate being coupled to the front wall, the first bottom plate extending outwardly from the front wall toward the back wall, the first bottom plate having a terminal edge being pivotably coupled to the front wall of the container wherein the front wall of the container is configured to pivot downwardly from the peripheral wall to permit access to the interior space;

a second bottom plate being coupled to the back wall, the second bottom plate extending outwardly from the back wall toward the front wall, the second bottom plate being slidably coupled to the first bottom plate wherein the second bottom plate slides outwardly from the first bottom plate when the peripheral wall is expanded and wherein the second bottom plate is positioned beneath the first bottom plate when the peripheral wall is retracted;

a top panel being openable to facilitate access to the interior space, the top panel being distally positioned to the bottom panel on each of the front wall and the back wall, the top panel being perpendicular to each of the front wall and the back wall when the top panel is closed, the top panel being parallel to the bottom panel, the top panel further comprising:

a first top plate being coupled to the front wall, the first top plate extending outwardly from the front wall toward the back wall, the first top plate being releasably coupled to the front wall wherein the first top plate is detachable from the front wall when the front wall is pivoted downwardly from the terminal edge of the first bottom plate;

a second top plate being coupled to the back wall, the second top plate extending outwardly from the back wall toward the front wall, the second top plate being slidably coupled to the first top plate wherein the second top plate slides outwardly from the first top plate when the peripheral wall is expanded and wherein the second top plate is positioned beneath the first top plate when the peripheral wall is retracted, the second top plate being pivotably coupled to an upper edge of the back wall wherein the second top plate is configured to pivot upwardly from the back wall to permit access to the interior space;

a pair of lateral panels being parallel with each other, the pair of lateral panels being perpendicular to the front wall and the back wall, the pair of lateral panels being perpendicular to the bottom panel and the top panel, the pair of lateral panels being aligned with opposing lateral sides of the side wall of the bed of the pickup truck when the container is positioned in the bed of the pickup truck, each lateral panel of the pair of lateral panels further comprising:

a first side plate being coupled to and extending upwardly from the first bottom plate of the bottom panel toward the top panel;

a second side plate being coupled to and extending upwardly from the second bottom plate of the bottom panel toward the top panel, the second side plate being slidably coupled to the first side plate wherein the second side plate slides outwardly from the first side plate when the peripheral wall is expanded and wherein the second side plate is positioned over the first side plate when the peripheral wall is retracted;

a front hinge pivotably coupling the first bottom plate of the bottom panel of the peripheral wall to the front wall of the container, the front hinge being configured to facilitate the front wall of the container in being pivoted 180.0° relative to the terminal edge of the first bottom plate wherein the front wall is pivotable between a primary open position, a secondary open position, and a shut position, wherein the primary open position is 90.0° from the shut position and wherein the primary open position is 180.0° from the secondary open position;

a top hinge pivotably coupling the second top plate of the top panel of the peripheral wall to the back wall of the container, the top hinge being configured to facilitate the top panel of the peripheral wall of the container in pivoting 270.0° relative to the upper edge of the back wall of the container wherein the top panel is pivotable between a first open position, a second open position, and a closed position, wherein the first open position is 90.0° from the closed position and wherein the second open position is 270.0° from the closed position;

a plurality of telescopic slides being coupled to the peripheral wall of the container wherein the plurality of telescopic slides is configured to facilitate expansion and retraction of the peripheral wall of the container, the plurality of telescopic slides further comprising:

a first telescopic slide being coupled to a first lateral panel of the pair of lateral panels, the first telescopic slide slidably coupling the first side plate of the first lateral panel to the second side plate of the first lateral panel;

a second telescopic slide being coupled to a second lateral panel of the pair of lateral panels, the second telescopic slide slidably coupling the first side plate of the second lateral panel to the second side plate of the second lateral panel, the second telescopic slide being aligned with the first telescopic slide across the container;

a third telescopic slide being coupled to the bottom panel, the third telescopic slide slidably coupling the first bottom plate to the second bottom plate, the third telescopic slide being positioned adjacent to a junction between the bottom panel and the first lateral panel of the pair of lateral panels;

a fourth telescopic slide being coupled to the bottom panel, the fourth telescopic slide slidably coupling the first bottom plate to the second bottom plate, the fourth telescopic slide being spaced from the third telescopic slide;

a fifth telescopic slide being coupled to the bottom panel, the fifth telescopic slide slidably coupling the first bottom plate to the second bottom plate, the fifth telescopic slide being positioned adjacent to a junction between the bottom panel and the second lateral panel of the pair of lateral panels;

a sixth telescopic slide being coupled to the top panel, the fifth telescopic slide slidably coupling the first top plate to the second top plate, the sixth telescopic slide being positioned adjacent to a junction between the top panel and the first lateral panel of the pair of lateral panels;

a seventh telescopic slide being coupled to the top panel, the seventh telescopic slide slidably coupling the first top plate to the second top plate, the seventh telescopic slide being spaced from the sixth telescopic slide;

an eighth telescopic slide being coupled to the top panel, the eighth telescopic slide slidably coupling the first top plate to the second top plate, the eighth telescopic slide being positioned adjacent to a junction between the top panel and the second lateral panel of the pair of lateral panels;

a pulley mechanism being coupled to the container and the pair of rails, the pulley mechanism being configured to slide the container along the pair of rails between the front end and the rear end of the bed of the pickup truck, the pulley mechanism further comprising:

an axle being coupled to and extending outwardly from a first rail of the pair of rails;

a pulley wheel being rotatably coupled to the axle wherein the pulley wheel is configured to rotate around the axle in a first direction and a second direction, the first direction being clockwise, the second direction being counterclockwise;

a rope being coupled to the pulley wheel, the rope having a primary end, a secondary end, and an elongated body, the elongated body being wrapped around the pulley wheel, wherein the rope rotates the pulley wheel in the first direction when the primary end is pulled and wherein the rope rotates the pulley wheel in the second direction when the secondary end is pulled, the rope being coupled to an exterior surface of the bottom panel of the peripheral wall of the container wherein the pulley mechanism urges the container forwardly toward the front end of the bed of the pickup truck when the primary end is pulled and wherein the pulley mechanism urges the container backwardly toward the rear end of the bed of the pickup truck when the secondary end is pulled;

a plurality of rollers being coupled to the exterior surface of the bottom panel of the peripheral wall of the container, the plurality of rollers being positionable on the pair of rails to facilitate the container in sliding along the pair of rails, the plurality of rollers further comprising:

a first pair of rollers being positioned adjacent to the first lateral panel of the pair of lateral panels of the peripheral wall of the container, the first pair of rollers being aligned with each other between the front wall and the back wall of the container wherein the first pair of rollers is configured to engage the first rail of the pair of rails;

a second pair of rollers being positioned adjacent to the second lateral panel of the pair of lateral panels of the peripheral wall of the container, the second pair of rollers being aligned with each other between the front wall and the back wall of the container wherein the second pair of rollers is configured to engage a second rail of the pair of rails;

a pair of grooves extending into the first rail of the pair of rails, the pair of grooves further comprising:

a first groove being positioned proximate to the first end cap of the first rail of the pair of rails;

a second groove being positioned proximate to the second end cap of the first rail of the pair of rails;

a pair of tongues being pivotably coupled to the exterior surface of the bottom panel of the peripheral wall of the container, the pair of tongues being biased downwardly to engage a groove of the pair of grooves to secure a position of the container relative to the pair of rails, the pair of tongues being coupled to the rope of the pulley mechanism wherein at least one of the pair of tongues pivots upwardly toward the bottom panel to disengage from the groove of the pair of grooves when the rope is pulled thereby releasing the position of the container relative to the pair of rails, the pair of tongues further comprising:

a first tongue being positioned proximate to the front wall of the container, the first tongue being positioned adjacent to the first pair of rollers, the first tongue being configured to pivot upwardly when the primary end of the rope is pulled;

a second tongue being positioned proximate to the back wall of the container, the second tongue being positioned adjacent to the first pair of rollers, the second tongue being configured to pivot upwardly when the secondary end of the rope is pulled;

an insulating material being coupled to the container, the insulating material being configured to insulate contents of the container from outside temperatures, the insulating material being positioned between the first bottom plate and the second bottom plate when the peripheral wall of the container is retracted, the insulating material being positioned between the first top plate and the second top plate when the peripheral wall of the container is retracted, the insulating material being positioned between the first side plate and the second side plate of each lateral panel of the pair of lateral panels when the peripheral wall is retracted;

a seal being coupled to the container, the seal being configured to inhibit air transfer into the container when the front wall of the container is closed and when the top panel of the peripheral wall of the container is closed, the seal being positioned at a junction between the top panel of the peripheral wall and the front wall;

a plurality of power outlets being coupled to the back wall of the container, the plurality of power outlets being positioned in the interior space, each power outlet of the plurality of power outlets being configured to receive a charging cord for charging a power tool;

a power inverter being electrically coupled to the plurality of power outlets, the power inverter being coupled to an interior surface of the container, the power inverter being positioned adjacent to the back wall of the container, the power inverter being configured to direct power from an external power source to the plurality of power outlets wherein the external power source comprises a car battery of the pickup truck;

a power cord being electrically coupled to the plurality of power outlets, the power cord being electrically coupled to the power inverter, the power cord being coupled to and extending outwardly from the back wall of the container, the power cord being configured to engage the external power source for transferring power to the plurality of power outlets and the power inverter;

a shelf being positionable in the interior space of the container, the shelf being removably couplable to the peripheral wall of the container, the shelf being removably couplable to the back wall of the container, the shelf further comprising:

an upper board;

a lower board being movably coupled to the upper board wherein the lower board slides outwardly from beneath the upper board to expand a surface area of the shelf whereby the shelf is configured to extend from the back wall of the container to the front wall of the container when the peripheral wall of the container is expanded;

a slot extending into the back wall of the container, the slot being positioned in the interior space, the slot having a shape being complementary to a shape of the shelf wherein the shelf is positionable within the slot to couple the shelf to the back wall of the container, the slot being positioned below the plurality of power outlets wherein the plurality of power outlets are configured to be positioned above the shelf when the shelf is positioned within the slot;

a plurality of dividers being removably couplable to the shelf, the plurality of dividers being positionable on the upper board, the plurality of dividers extending upwardly from the upper board of the shelf to define a plurality of sections on the shelf.

* * * * *